(12) United States Patent
Kilmov

(10) Patent No.: US 11,699,088 B2
(45) Date of Patent: Jul. 11, 2023

(54) CALIBRATION OF QUANTUM PROCESSOR OPERATOR PARAMETERS

(71) Applicant: Google LLC, Mountain View, CA (US)

(72) Inventor: Paul Kilmov, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 1031 days.

(21) Appl. No.: 16/434,513

(22) Filed: Jun. 7, 2019

(65) Prior Publication Data
US 2020/0387822 A1 Dec. 10, 2020

(51) Int. Cl.
G06N 10/00 (2022.01)
G06F 15/82 (2006.01)
G06N 10/60 (2022.01)

(52) U.S. Cl.
CPC ............. *G06N 10/00* (2019.01); *G06F 15/82* (2013.01); *G06N 10/60* (2022.01)

(58) Field of Classification Search
None
See application file for complete search history.

(56) References Cited

U.S. PATENT DOCUMENTS 9,940,212 B2 * 4/2018 Kelly ................... G06F 11/2273

OTHER PUBLICATIONS

"Quantum Computing in the NISQ era and beyond" John Preskill, Quantum Journal (Year: 2018).*

"Quantum Computing: Progress and Prospects (2019)" Nation Academies of Sciences, Engineering and Medicine. Chapter 7 p. 176 (Year: 2019).*

US Application No. PCT/US2018/020696, Klimov et al., "Optimizing Qubit Operating Frequencies", filed on Mar. 2, 2018, 53 pages.

PCT International Preliminary Report on Patentability in International Application No. PCT/US2020/036363, dated Dec. 16, 2021, 12 pages.

Egger et al, "Adaptive Hybrid Optimal Quantum Control for Imprecisely Characterized Systems" arXiv, Jun. 2014, 11 pages.

Kelly et al, "Physical qubit calibration on a directed acyclic graph" arXiv, Mar. 2018, 7 pages.

Kelly et al, "Scalable in-situ qubit calibration during repetitive error detection" arXiv, Mar. 2016, 8 pages.

(Continued)

*Primary Examiner* — Bradley Smith
(74) *Attorney, Agent, or Firm* — Fish & Richardson P.C.

(57) ABSTRACT

Methods, systems and apparatus for determining operating parameters for a quantum processor including multiple interacting qubits. In one aspect, a method includes generating a graph of nodes and edges, wherein each node represents a respective qubit and is associated with an operating parameter of the respective qubit, and wherein each edge represents a respective interaction between two qubits and is associated with an operating parameter of the respective interaction; selecting an algorithm that traverses the graph based on a traversal rule; identifying one or multiple disjoint subsets of nodes or one or multiple disjoint subsets of edges, wherein nodes in a subset of nodes and edges in a subset of edges are related via the traversal rule; and determining calibrated values for the nodes or edges in each subset using a stepwise constrained optimization process where constraints are determined using previously calibrated operating parameters.

18 Claims, 16 Drawing Sheets

(56) References Cited

OTHER PUBLICATIONS

PCT International Search Report and Written Opinion in International Application No. PCT/US2020/036363, dated Sep. 18, 2020, 18 pages.
cnet.com [online], "IBM's new 53-qubit quantum computer is its biggest yet," Sep. 18, 2019, retrieved on Sep. 26, 2022, retrieved from URL<https://www.cnet.com/tech/computing/ibm-new-53-qubit-quantum-computer-is-its-biggest-yet/>, 3 pages.

* cited by examiner

CALIBRATION OF QUANTUM PROCESSOR OPERATOR PARAMETERS

BACKGROUND

This specification relates to quantum computing.

Large-scale quantum computers have the potential to provide fast solutions to certain classes of difficult problems. For large-scale quantum computing to be realizable, several challenges in the design and implementation of quantum architecture to control, program and maintain quantum hardware must be overcome.

SUMMARY

This specification relates to performing calibrations of quantum processor operating parameters using graph traversal and local optimization.

In general, one innovative aspect of the subject matter described in this specification can be implemented in a computer implemented method for determining quantum processor operating parameters, the method including the actions of, for a quantum processor having a plurality of interacting qubits, generating a graph comprising nodes and edges, wherein each node represents a respective qubit and is associated with a value representing an operating parameter of the respective qubit, and wherein each edge represents a respective interaction between two qubits and is associated with a value representing an operating parameter of the respective interaction; selecting a graph traversal algorithm that traverses the graph based on a traversal rule; identifying one or multiple disjoint subsets of nodes or one or multiple disjoint subsets of edges, wherein nodes in a subset of nodes are related via the traversal rule and edges in a subset of edges are related via the traversal rule; determining calibrated values for the nodes or edges in each subset, comprising, for each subset: selecting a seed node or a seed edge in the subset; stepwise, for the selected seed node or seed edge, and for each subsequent node or edge: performing a constrained optimization using i) an objective function for the node or edge, and ii) one or more constraints based on a calibrated operating parameter mapping comprising calibrated values of nodes or edges in the graph, to determine a calibrated value for the node or edge; determining whether each node or edge in the subset has been calibrated; in response to determining that each node or edge in the subset has not been calibrated, traversing the graph based on the traversal rule to select a subsequent node or edge for the step.

Other implementations of this aspect include corresponding classical and/or quantum computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the method further comprises storing the determined calibrated value in the calibrated operating parameter mapping.

In some implementations the traversal rule comprises an undirected traversal rule.

In some implementations the one or more constraints comprise constraints based on calibrated values of nodes or edges within a local region of predetermined size around the node or the edge.

In some implementations the method further comprises, in response to determining that each node or edge in the subset has been calibrated: determining whether each node or edge in the graph has been calibrated; and in response to determining that each node or edge in the graph has been calibrated, setting the operating parameters of the quantum processor to the calibrated values included in the calibrated operating parameter mapping.

In some implementation the method further comprises determining that all nodes or edges in the graph have not been calibrated: determining calibrated values for the nodes or edges in another subset that contains uncalibrated nodes or edges.

In some implementations the method further comprises determining whether any calibrated values of nodes or edges have timed out; and in response to determining that a calibrated value of a node or edge has timed out: updating the calibrated frequency mapping; discarding calibration values in a local region of predetermined size around the timed out calibrated value; maintaining calibrated values outside of the local region; and recalibrating the graph.

In some implementations recalibrating the graph comprises selecting a seed node or a seed edge corresponding to a timed out node or edge.

In some implementations the traversal rule comprises a node-traversal rule; identifying one or multiple disjoint subsets of nodes or one or multiple disjoint subsets of edges comprises identifying one or multiple disjoint subsets of nodes; determining calibrated values of the nodes or edges in each subset comprises determining calibrated values of the nodes in each subset; and selecting a seed node or a seed edge in the subset comprises selecting a seed node in the subset.

In some implementations the method further comprises selecting a graph traversal algorithm, wherein the graph traversal algorithm comprises an algorithm that traverses edges of the graph based on an edge traversal rule; identifying one or more disjoint subsets of edges, wherein nodes and edges in each of the disjoint subsets are connected using the traversal rule; determining calibrated values of the edges in each subset, comprising, for each subset: selecting a seed edge in the subset; stepwise, for the selected seed edge, and for each subsequent edge: performing a constrained optimization using i) an objective function for the edge, and ii) one or more constraints based on a calibrated operating parameter mapping comprising calibrated values of edges in the graph, to determine a calibrated value for the edge; determining whether each edge in the subset has been calibrated; in response to determining that each edge in the subset has not been calibrated, traversing the graph based on the traversal rule to select a subsequent edge for the step.

In some implementations the traversal rule comprises an edge traversal rule: identifying one or multiple disjoint subsets of nodes or one or multiple disjoint subsets of edges comprises identifying one or more disjoint subsets of edges; determining calibrated values of the nodes or edges in each subset comprises calibrating the edges in each subset; and selecting a seed node or a seed edge in the subset comprises selecting a seed edge in the subset.

In some implementations the method further comprises selecting a graph traversal algorithm, wherein the graph traversal algorithm comprises an algorithm that traverses nodes of the graph based on an node traversal rule; determining a complete traversal set comprising one or more disjoint subsets of nodes, wherein nodes and edges in each of the disjoint subsets are connected using the traversal rule; determining calibrated values of the nodes in each subset, comprising, for each subset: selecting a seed node in the subset; stepwise, for the selected seed node, and for each subsequent node: performing a constrained optimization using i) an objective function for the node, and ii) one or more constraints based on a calibrated operating parameter mapping comprising calibrated values of nodes in the graph, to determine a calibrated value for the node; determining whether each node in the subset has been calibrated; in response to determining that each node in the subset has not been calibrated, traversing the graph based on the traversal rule to select a subsequent node for the step.

In some implementations the traversal rule comprises a node-traversal rule; identifying one or multiple disjoint subsets of nodes or one or multiple disjoint subsets of edges comprises identifying one or more disjoint subsets of nodes; and the method further comprises determining calibrated values of the nodes and edges in each subset, comprising, for each subset: selecting a seed node in the subset; stepwise, for the selected seed node, and for each subsequent node: performing a constrained optimization using i) an objective function for one or more nodes and one or more edges, and ii) one or more constraints based on calibrated values in the calibrated operating frequency mapping of calibrated nodes or edges within a local region of predetermined size around the node, to determine a calibrated value for the node and one or more edges that connect the node to an already calibrated node; determining whether each node or edge in the subset has been calibrated; in response to determining that each node or edge in the subset has not been calibrated, traversing the graph based on the traversal rule to select a subsequent node for the step.

In some implementations determining calibrated values of the nodes or edges in each subset is performed in parallel for each subset.

In some implementations the method further comprises separating the graph of nodes and edges into multiple subgraphs; performing the method of any one of claims 1 to 14 for some or all of the multiple subgraphs in parallel; recombining the subgraphs into the graph; determining whether the graph comprises one or more un-calibrated subgraphs; and in response to determining that the graph comprises one or more un-calibrated subgraphs, calibrating the graph.

In some implementations selecting the graph traversal algorithm comprises selecting the graph traversal algorithm based on the interactions between qubits in the quantum processor.

In some implementations the operating parameter of the respective qubit comprises an idling frequency, readout frequency, or interaction frequency of the respective qubit.

The subject matter described in this specification can be implemented in particular ways so as to realize the following advantages.

A system implementing the presently described calibration techniques may efficiently and effectively calibrate quantum processor operating parameters, thus increasing the reliability and performance of the quantum processor, in turn improving the reliability and performance of quantum computations performed by the quantum processor. Calibration of quantum operator processor parameters using the presently described techniques may be more tractable and achieved more efficiently than other calibration techniques, e.g., a brute-force approach such as a global-optimization calibration approach.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
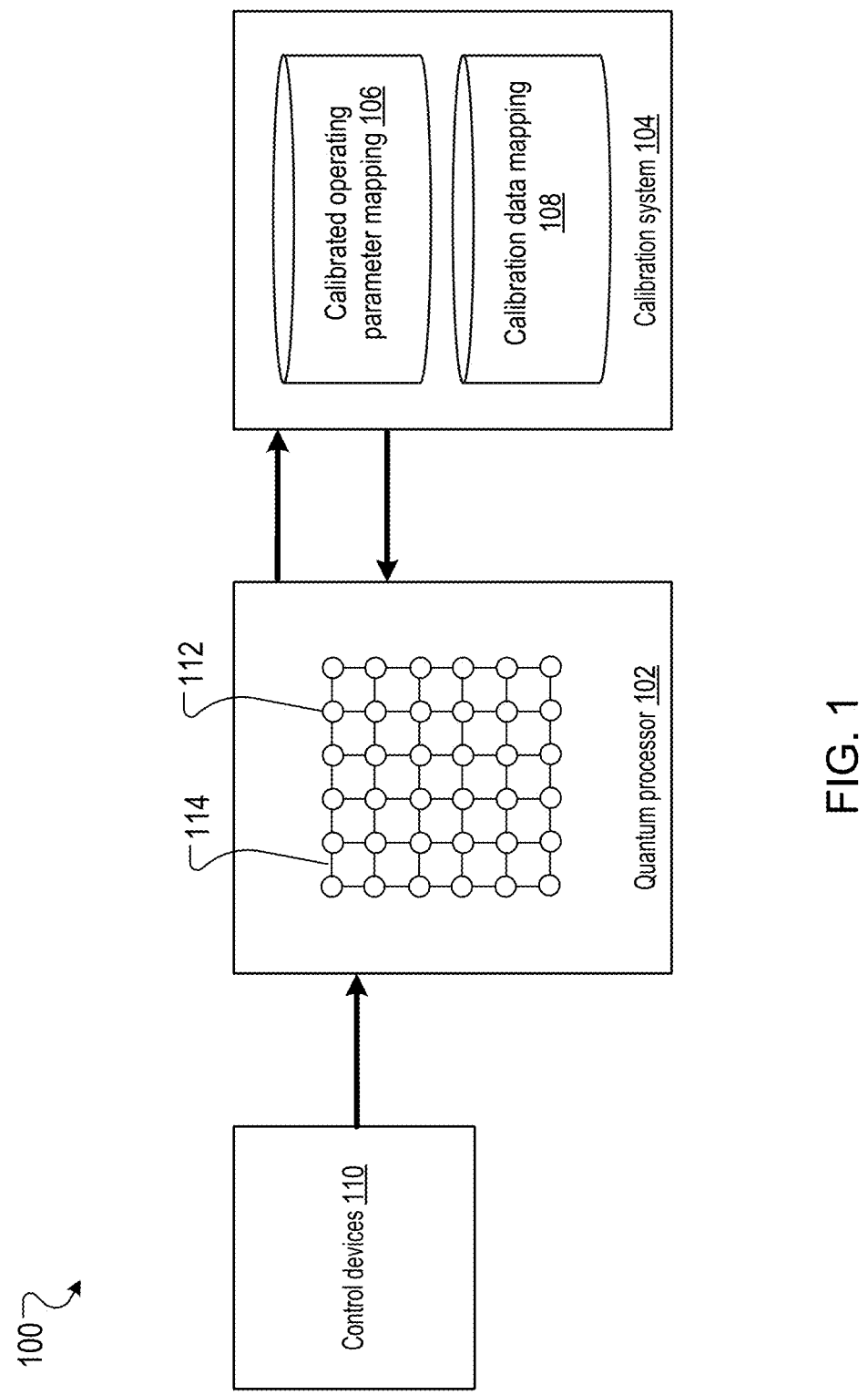
FIG. 1 depicts an example system for calibrating operating parameters of a quantum processor.

Before running a quantum algorithm on a quantum processor, qubit operating parameters are adjusted to optimal values—or "calibrated". When the qubit operating parameters are independent of one another, calibrating qubit operating parameters is a relatively simple task since each operating parameter for each qubit can be calibrated independently one-by-one. However, when qubit parameters have complex interdependencies—which can happen due to wanted or unwanted interactions between the computing elements in a quantum processor (e.g. qubits, readout resonators, control lines)—the calibration process becomes substantially more complicated.

This specification describes techniques for calibrating both independent and highly intertwined and highly constrained qubit operating parameters. The specification uses qubit idle frequencies and qubit-pairs' interaction frequencies as example parameters under calibration, however the techniques can equally be applied to the calibration of any quantum processor operating parameters, e.g., qubit readout frequencies, control-pulse parameters, tunable-coupler parameters.

In this specification, qubit idle frequencies and qubit-pairs interaction frequencies are referred to as operating frequencies. For a quantum processor with N qubits on a square grid with nearest-neighbor coupling, there are N idle frequencies and ~2N interaction frequencies to calibrate. The total number of operating frequency configurations for the full processor depends on the number of available operating frequencies per qubit. Under the simplifying assumption that each qubit can operate at k different frequencies, there are $\sim k^{3N}$ different operating frequency configurations to choose from. In realistic cases k~100, so the total number of operating frequency configurations is $\sim 100^{3N}$, which is significantly larger than the dimension of the Hilbert space of the processor, $2^N$.

Each operating-frequency configuration is generally associated with different quantum-processor performance metrics. Frequency calibration may therefore be viewed as an optimization problem. To solve this optimization problem, an objective function that maps operating frequencies to some performance metric—for example single- and/or two-qubit gate errors, or quantum-algorithm error—must be minimized. However, this is complex for many reasons, including but not limited to:

1. The objective function is high-dimensional: there are N idle and ~2N interaction frequencies to optimize.
2. There is a large search-space: there are ~k^(3N) configurations given k operating frequencies per qubit.
3. The objective function is non-convex: noisy objective-function data and frequency-dependent performance fluctuations must be considered.
4. Limitations of the control hardware impose constraints on possible frequency configurations.
5. Qubit-qubit parasitic coupling imposes constraints on accessible frequency configurations.
6. Qubit control crosstalk imposes constraints on accessible frequency configurations.
7. The quantum algorithm for which the processor is calibrated imposes constraints on accessible frequency configurations.
8. Performance metrics fluctuate unpredictably in frequency.
9. Performance metrics fluctuate unpredictably between qubits with nominally identical design and fabrication parameters
10. Performance metrics fluctuate unpredictably in time. This means that any acceptable frequency configuration will eventually evolve into an unacceptable configuration.

A brute-force strategy for solving this problem is to use a global optimizer to minimize the objective function with respect to all frequencies simultaneously. However, because of the complications mentioned above, global optimizers are generally inefficient at finding acceptable solutions quickly for large-scale quantum processors. It is therefore desirable to simplify the optimization problem.

This specification describes systems, methods and techniques for simplifying and solving the above described frequency optimization problem. The strategy includes reducing a ~3N-dimensional global optimization problem with search space $\sim k^{3N}$ into multiple lower-dimensional optimization problems with exponentially reduced search spaces. Applied to its extreme, this strategy can reduce the optimization problem to ~3N 1-dimensional problems, each with search space ~k, and local constraints.

The method includes mapping the frequency-calibration problem into a graph-traversal problem. Therein, the quantum processor is represented by a graph. Qubits are represented by nodes, which may have idle frequencies associated with them that need to be calibrated. Interactions between those qubits are represented by edges, which may have interaction frequencies associated with them that need to be calibrated. The calibration problem thus reduces to traversing a graph while calibrating nearby uncalibrated nodes and/or edges. Traversal may be accomplished with an arbitrary graph traversal algorithm and calibration may be accomplished by optimizing a local objective function constrained by previously-calibrated nodes and/or edges.

For convenience, the techniques described in this specification are applied to a 2-dimensional qubit grid topology and the frequencies considered are the parameters that are being calibrated. However, the same techniques extend to any qubit topology and to the calibration of any quantum processor parameter.

Example Operating Environment

FIG. 1 depicts an example system 100 for calibrating operating parameters of a quantum processor. The example system 100 is an example of a system implemented as classical and/or quantum computer programs on one or more classical computers and/or quantum computing devices in one or more locations, in which the systems, components, and techniques described below can be implemented.

The system 100 includes a quantum processor 102 in communication with a calibration system 104 that includes a data store 106 that stores a calibrated operating parameter mapping and a data store 108 that stores a calibration data mapping (which can be used to construct calibration objective functions).

The quantum processor 102 includes multiple qubits, e.g., qubit 112, that interact via respective interactions, e.g., 114. The qubits may be used to perform algorithmic operations or quantum computations. The specific realization of the one or more qubits and their interactions may depend on a variety of factors including the type of quantum computations that the quantum processor is performing. For example, the qubits may include qubits that are realized via atomic, molecular or solid-state quantum systems. In other examples the qubits may include, but are not limited to, superconducting qubits or semi-conducting qubits. For clarity, thirty-six qubits nearest neighbor interactions are depicted in FIG. 1, however the system may include a smaller or larger number of qubits and a smaller or larger number of interactions.

The multiple interacting qubits can be frequency tunable, that is each qubit, e.g., 112 may have associated operating frequencies that can be adjusted, e.g., using one or more control devices 110, through application of voltage pulses via a driveline coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates.

In some implementations, e.g., when the qubits interact via couplers with fixed coupling, qubits can be configured to interact with one another by setting their respective operating frequencies at some gate-dependent frequency detuning from their common interaction frequency. In other implementations, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform two-qubit or many-qubit gates.

The calibration system 104 includes a classical or quantum processing device and communicates with the quantum processor 102. The calibration system 104 calibrates the quantum processor 102 by determining calibrated values of qubit parameters, e.g., idling frequencies and interactions frequencies, and in some cases coupler parameters, e.g., idling frequencies and interaction frequencies. To determine such calibrated values. The calibration system 104 may be configured to perform operations according to the techniques described in this specification, e.g., the example process 200, to determine calibrated values of operating frequencies.

Figure 2:
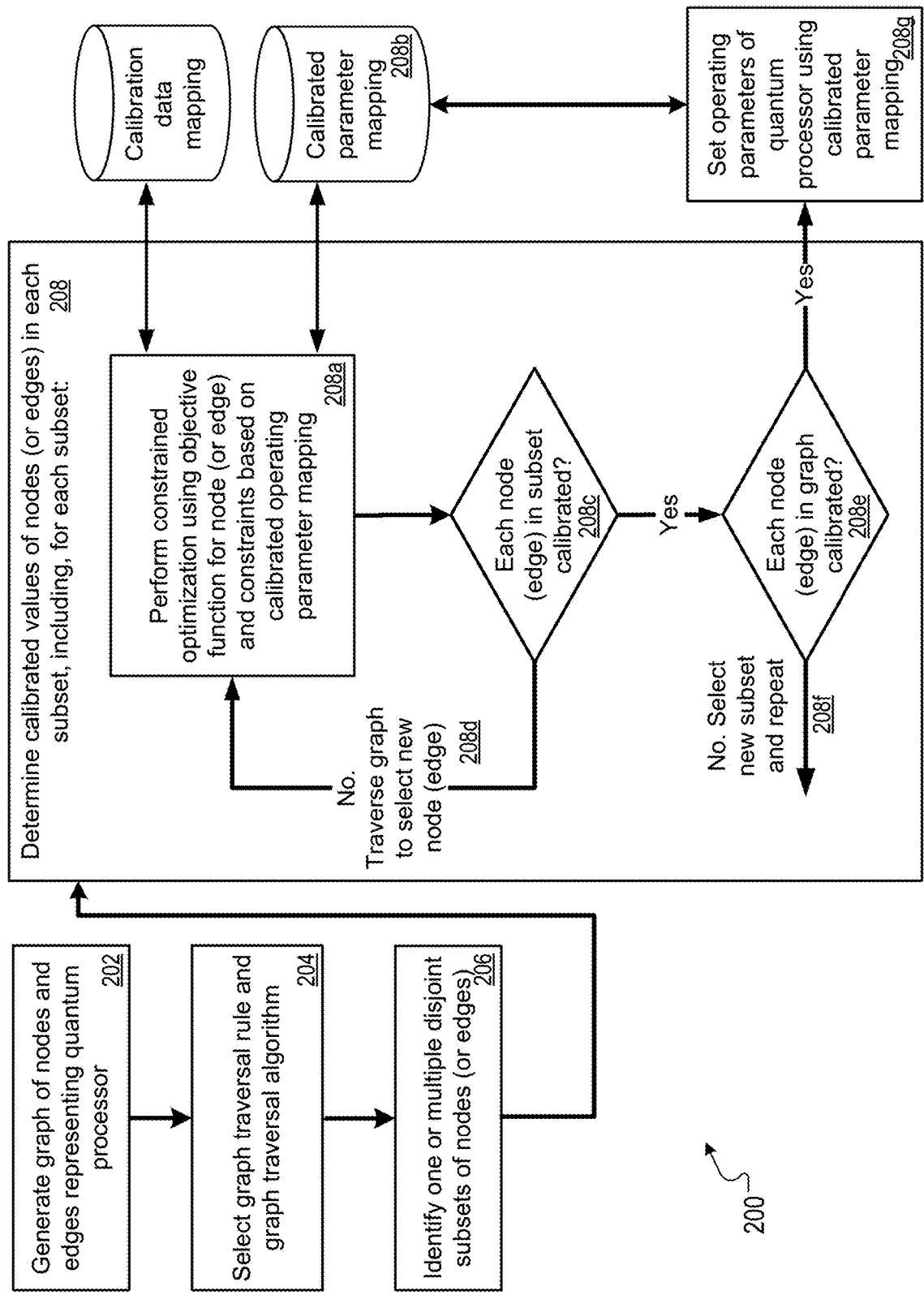
FIG. 2 is a flow diagram of an example process for determining quantum processor operating parameters.

Example Method for Calibrating a Fully or Partially Calibrated Quantum Processor: Calibration of Qubit Idle Operating Frequencies or Interaction Operating Frequencies FIG. 2 is a flowchart of an example process 200 for determining quantum processor operating frequencies. For convenience, the process 200 will be described as being performed by a system of one or more classical or quantum computing devices located in one or more locations. For example, a qubit calibration system, e.g., the qubit calibration system 100 and of FIG. 1, appropriately programmed in accordance with this specification, can perform the process 200.

For a quantum processor having a plurality of interacting qubits, the system generates a graph comprising nodes and edges (step 202). The generated graph G represents the quantum processor. In the examples and figures described in this specification, it is assumed that G is a 2-dimensional grid. However, other graph structures can also be considered.

Each node in the graph represents a respective qubit and is associated with a value representing an operating parameter of the respective qubit, e.g., an idling frequency of the respective qubit. A node may be represented as $n_{ij}$ where i indexes its column and j indexes its row (in an example 2-dimensional grid). A node $n_{ij}$ may have a parameter $f_{ij}$ associated with it that needs to be calibrated. N represents the set of all nodes in a graph G.

Each edge between nodes in the graph represents a respective interaction between two qubits and is associated with a value representing an operating parameter of the respective interaction. There may be different types of edges, corresponding to different interaction types or strengths. For example, the edges may have different weights that correspond to the different interaction strengths. In an architecture with tunable couplers, edges may represent the couplers. However, not all edges need have couplers associated with them. In particular, in some cases stray unwanted interactions between different qubits on the chip may exist, and it may be beneficial to include these stray unwanted interactions as edges in this problem (since they would then add constraints during the calibration process, making the process more realistic and more effective). An edge between nodes $n_{ij}$ and $n_{kl}$ may be represented as $e_{ijkl}$. An edge may have an interaction frequency $f_{ijkl}$ associated with it that needs to be calibrated. E represents the set of all edges in a graph G.

Figure 3:
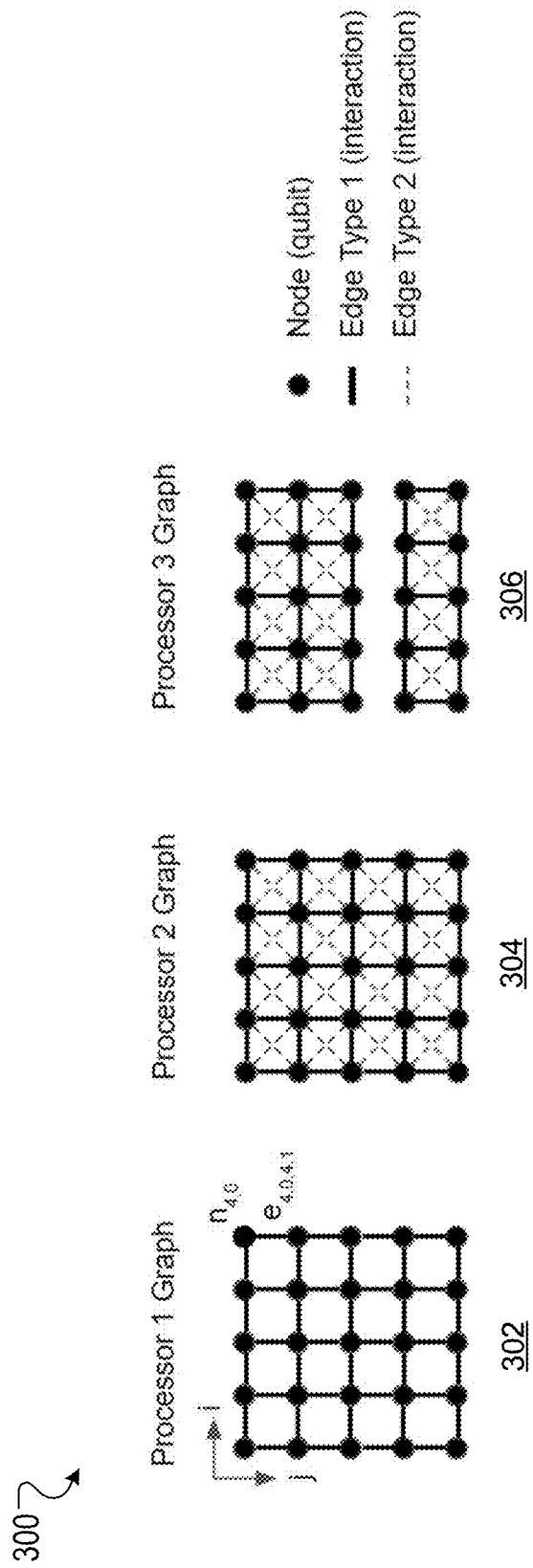
FIG. 3 shows three graphs representing three example quantum processors.

FIG. 3 is an illustration 300 of three example graphs 302, 304 and 306 that represent respective quantum processors. As described above, for convenience the example graphs 302, 304 and 306 are based on a 2-dimensional grid of nodes (e.g., representing a 2-dimensional qubit lattice). However, in some implementations the graphs may vary in size and/or dimension.

Example graph 302 includes a grid of 5×5=25 nodes representing respective qubits. Each node is connected to its nearest neighbor nodes by respective edges of a same type. For example, graph 302 may represent a 2-dimensional lattice of 25 qubits with nearest neighbor interactions achieved through respective couplers of a same type.

Example graph 304 also includes a grid of 5×5=25 nodes representing respective qubits. Each node is connected to its nearest neighbor nodes by respective edges of a first type (solid edges). Diagonal nodes are connected by edges of a second type (dashed edges). For example, graph 304 may represent a 2-dimensional lattice of 25 qubits with nearest neighbor interactions achieved through respective couplers of a first type, and diagonal interactions achieved through respective couplers of a second type.

Example graph 306 also includes a grid of 5×5=25 nodes representing respective qubits. A first subset of nodes 306a are connected to their nearest neighboring nodes by respective edges of a first type. Nodes in the first subset of nodes 306a are also diagonally connected by edges of a second type. A second subset of nodes 306b are connected to their nearest neighboring nodes by respective edges of a first type. Nodes in the second subset of nodes 306b are also diagonally connected by edges of a second type. For example, the first type of edges may include edges that represent tunable couplers, whereas the second type of edges may include edges that represent untenable interactions, e.g., stray interactions, as described above. No nodes in the first subset are connected to any node in the second subset.

Returning to FIG. 2, the system selects a graph traversal algorithm that traverses at least one of nodes or edges of the graph based on a traversal rule (step 204).

A traversal rule is a rule that achieves a target graph-traversal behavior, e.g., depth-first traversal, breadth-first traversal, or random traversal. A traversal rule determines the order in which nodes and/or edges may be calibrated.

In some cases, a heuristic may be embedded within a traversal rule to guide traversal, such as in an A* search. For example, in some cases it may be beneficial to traverse nodes and/or edges such that the area-to-boundary ratio of traversed nodes and/or edges is maximized, since then the number of constraints on each optimization problem during graph calibration may be reduced. For example, considering FIG. 8 described below, during the sixth step of calibration the node $n_{0,1}$ being calibrated has 5 constraints (represented by arrows). If a different traversal algorithm that snakes around the graph in a Z pattern were to be used instead—completing each row before proceeding onto the next—the maximum number of constraints on any one node would be 4. This may be beneficial because typically the fewer constraints, the easier it may be to find a good solution. In this case, the heuristic may be the distance from the first-traversed node. A traversal rule may be implemented as a function that takes the graph and the current node or edge as input, and returns a set of nodes and/or edges from which a system implementing a graph-traversal algorithm can select its next step. Two example traversal rules are given below:

---
Example Node-Traversal Rule:
  node_traversal_rule(G, $n_{i,j}$) :
    # Finds nodes connected via horizontal or vertical edges
    return $\{n_{i',j'} \in G : |i' -i| + |j' -j| = 1 \text{ and } e_{i,j,i',j'} \in G\}$
Example Edge-Traversal Rule:
  edge_traversal_rule (G, $e_{i,j,k,l}$) :
    # Finds horizontal or vertical edges connected via diagonal edges
    if $|k - i| = 1$ and $|l - j| = 0$:
      # Case of a horizontally-oriented edge
      return $\{e_{i',j',k',l'} \in G : (j' -j) = (l' -l) = \pm 1 \text{ and } (i' -i) = (k' -k) = \pm 2\}$
    if $|k - i| = 0$ and $|l - j| = 1$:
      # Case of a vertically-oriented edge
      return $\{e_{i',j',k',l'} \in G : (j' -j) = (l' -l) = \pm 2 \text{ and } (i' -i) = (k' -k) = \pm 1\}$
---

The above traversal rules are undirected traversal rules since if a node $n_{i,j}$ can map to $n_{i',j'}$, then $n_{i',j'}$ can map back to $n_{i,j}$. Likewise, if an edge $e_{ijkl}$ can map to $e_{i',j',k',l'}$, then $e_{i',j',k',l'}$ can map back to $e_{ijkl}$. Undirected rules can have useful properties that are discussed below.

A traversal algorithm is an algorithm that traverses nodes and/or edges of a graph based on a traversal rule. A traversal algorithm may be implemented as a function that takes the graph, the current node or edge, a selected traversal rule, and a traversal set T that contains previously traversed nodes and/or edges as input. The traversal algorithm may then traverse the graph while updating the traversal set T with newly traversed nodes and/or edges.

Two example traversal algorithms are given below:

---
Example Recursive Node Traversal Algorithm
---
node_traversal_algorithm(G, T, n, node_traversal_rule) :
  # If n has not yet been traversed
  if n $\notin$ T:
    # add node to traversal set
    T = T $\cup$ {n}
    # traverse un-traversed nodes quided by node_traversal_rule.
    for {n' $\in$ node_traversal_rule (G, n) : n' $\notin$ T}:
      node_traversal_algorithm (G, T, n' , node_traversal_rule)

---
Example Recursive Edge Traversal Algorithm|
---
edge_traversal_algorithm(G, T, e, edge_traversal_rule):
  # If e has not been traversed
  if e $\notin$ T:
    # add edge to traversal set
    T = T $\cup$ {e}
    # traverse un-traversed edges guided by edge_traversal_rule.
    for {e' $\in$ edge_traversal_rule(G, e) : e' $\notin$ T} :
      edge_traversal_algorithm(G, T, e', edge_traversal_rule)
---

Figure 4:
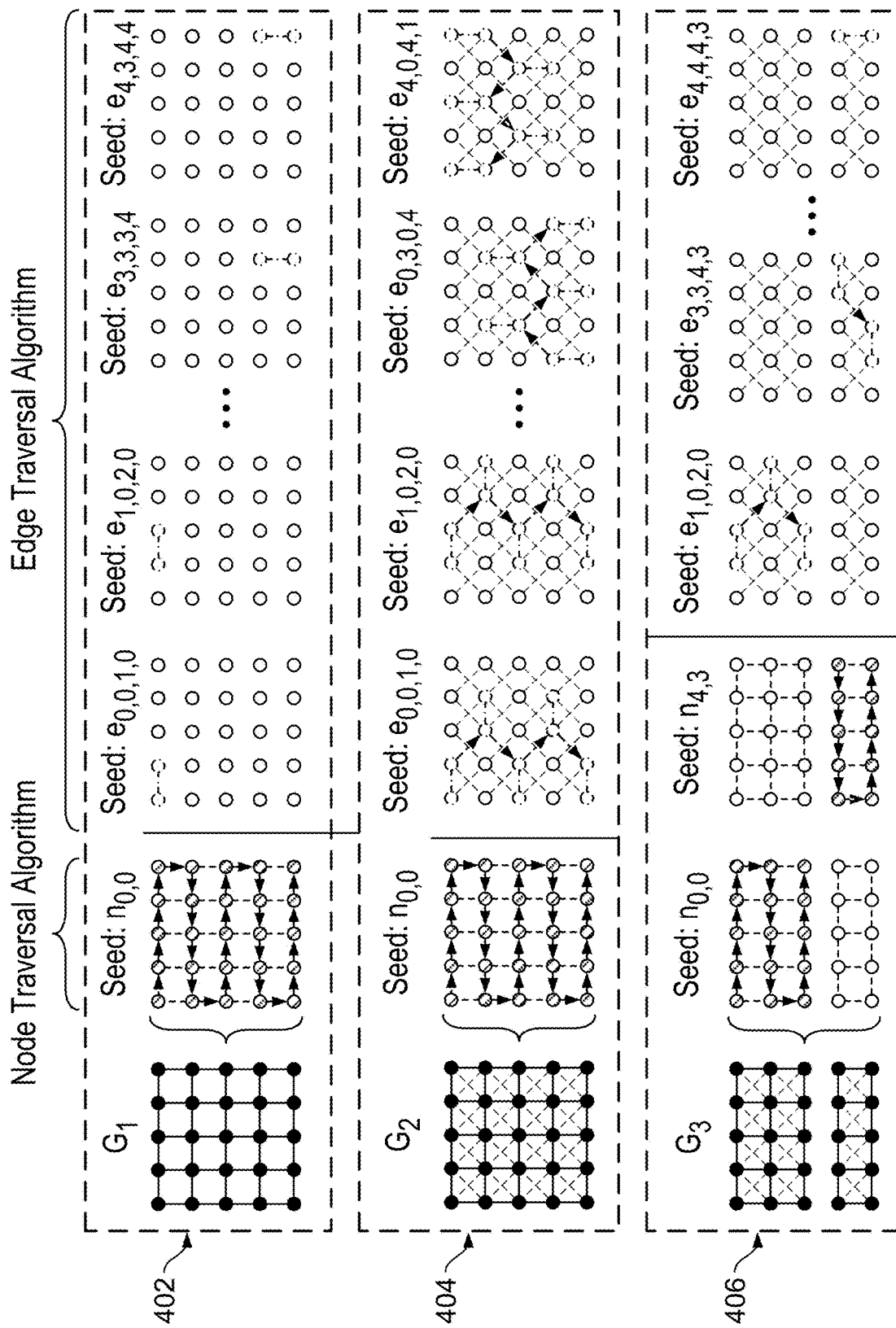
FIG. 4 is an illustration of an example node traversal algorithm and edge traversal algorithm applied to different graphs representing example quantum processors.

FIG. 4 is an illustration of a same example node traversal algorithm and edge traversal algorithm applied to different graphs representing respective quantum processors.

Box 402 illustrates an example node traversal algorithm and an example edge traversal algorithm applied to the example graph 302 described above with reference to FIG. 3. In the application of the example node traversal algorithm, the algorithm is seeded with node $n_{0,0}$ (top left node) and traverses the graph $G_1$ (corresponding to graph 302) node by node using a node traversal rule that, at each step, selects a new node that is connected by a horizontal or vertical edge. In the application of the example edge traversal algorithm, the algorithm is seeded with different seed edges and traverses the graph $G_1$ edge by edge using an edge traversal rule that, at each step, selects a new parallel edge that is connected to the current edge via a diagonal edge. Since there are no diagonal edges in $G_1$, seeding from a single edge leads to a traversal set with that one edge only. Therefore, to traverse all edges of the graph with this edge traversal algorithm, it is necessary to seed from multiple edges (note that this is where the concept of a complete traversal set becomes useful, as described below).

Box 404 illustrates an example node traversal algorithm and an example edge traversal algorithm applied to the example graph 304 described above with reference to FIG. 3. In the application of the example node traversal algorithm, the algorithm is seeded with node $n_{0,0}$ (top left node) and traverses the graph $G_2$ (corresponding to graph 304) node by node using a node traversal rule that, at each step, selects a new node that is connected by a horizontal or vertical edge. In the application of the example edge traversal algorithm, the algorithm is seeded with different edges and traverses the graph $G_2$ edge by edge using an edge traversal rule that, at each step, selects a new parallel edge that is connected to the current edge via a diagonal edge. To traverse all edges of the graph with this edge traversal algorithm, it is necessary to seed from multiple edges.

Box 406 illustrates an example node traversal algorithm and an example edge traversal algorithm applied to the example graph 306 described above with reference to FIG. 3. In the application of the example node traversal algorithm, the algorithm traverses the graph $G_3$ (corresponding to graph 306) node by node using a node traversal rule that, at each step, selects a new node that is connected by a horizontal or vertical edge. Because the graph $G_3$ includes two disjoint subgraphs, the node traversal algorithm must be seeded twice to traverse all nodes of the graph—for example, once with node $n_{0,0}$ and once with node $n_{4,3}$. In the application of the example edge traversal algorithm, the algorithm is seeded with multiple edges and traverses the graph $G_3$ edge by edge using an edge traversal rule that, at each step, selects a new parallel edge that is connected to the current edge via a diagonal edge.

The above described and illustrated recursive node- and edge-traversal algorithms, in combination with the example undirected traversal rules introduced above, have the below properties:

The traversal set $T_n$, after executing node_traversal_algorithm with node_traversal_rule has three important properties:
  1. $T_n \subseteq N$. This means that $T_n$ might NOT contain all nodes in a graph.
  2. $T_n'=T_n$ if $n' \in T_n$. This means that executing a traversal algorithm on any $n' \in T_n$ will generate the same traversal set $T_n$.
  3. $T_n \cap T_n'=\{ \}$ if $n' \notin T_n$. This means that executing a traversal algorithm on any $n' \notin T_n$ will generate a disjoint traversal set $T_n'$ that does not share any elements with $T_n$.

The traversal set $T_e$, after executing edge_traversal_algorithm with edge_traversal_rule, has three important properties:
  1. $T_e \subseteq E$. This means that $T_e$ might NOT contain all nodes in a graph.
  2. $T_e'=T_e$ if $e' \in T_e$. This means that executing a traversal algorithm on any $e' \in T_e$ will generate the same traversal set $T_e$.
  3. $T_e \cap T_e'=\{ \}$ if $e' \notin T_e$. This means that executing a traversal algorithm on any $e' \notin T_e$ will generate a disjoint traversal set $T_e'$ that does not share any elements with $T_e$ From these properties, it can be seen that to traverse all nodes of a graph, it may be necessary to execute the traversal algorithm on multiple seed nodes with distinct traversal sets. Likewise, to traverse all edges of a graph, it may be necessary to execute the traversal algorithm on multiple seed edges with distinct traversal sets. To understand how to select efficient seed nodes or edges—such that each node and edge is traversed once and only once—the concept of a complete traversal set is described below.

Returning to FIG. 2, the system may select the graph traversal algorithm based on the architecture of the quantum processor and/or the quantum algorithm for which the quantum processor is being calibrated. For example, in a quantum processor architecture with only vertical and horizontal edges (e.g., corresponding to graph 302 of FIG. 3), a node traversal rule and algorithm may be chosen such that traversals happen only between nodes connected via vertical or horizontal edges. However, there is a measure of flexibility when choosing the traversal rule and algorithm. It is up to the operator to determine a good traversal rule and traversal algorithm depending on the details of the quantum processor architecture and the quantum algorithm for which the processor is being calibrated. Namely, using the same traversal rule and algorithm on two distinct quantum processor architectures with the same underlying graph may result in completely different results.

The system identifies one or multiple disjoint subsets of nodes or one or multiple disjoint subsets of edges (step 206). In cases where the system identifies one or multiple disjoint subsets of nodes, the nodes in a subset of nodes are related via the traversal rule described above with reference to step 204. In this case the one or multiple disjoint subsets of nodes are a complete node-traversal set.

A complete node-traversal set is a set of node-traversal sets $\mathcal{T}_N = \{T_n, \ldots, T_n'\}$ such that $N = \cup_{T \in \mathcal{T}_N} T$ and $T_n \cap T_n' = \{\}$ for any distinct $T_n, T_n' \in \mathcal{T}_N$. Therefore, to traverse all nodes of a graph once and only once, it is sufficient to run the node-traversal algorithm on a single seed node drawn from each node-traversal set in $\mathcal{T}_N$.

In cases where the system identifies one or multiple disjoint subsets of edges, the edges in a subset of edges are related via the traversal rule described above with reference to step 204. Similarly, in this case the one or multiple disjoint subsets of edges are a complete-edge traversal set.

A complete edge-traversal set is a set of edge-traversal sets $\mathcal{T}_E = \{T_E, \ldots, T_e'\}$ such that $E = \cap_{T \in \mathcal{T}_E} T$ and $T_e \cap T_e' \{\}$ for any distinct $T_e, T_e' \in \mathcal{T}_E$. Therefore, to traverse all edges of a graph once and only once, it is sufficient to run the edge-traversal algorithm on a single seed node drawn from each node-traversal set in $\mathcal{T}_E$.

In addition to serving as a guide for seeding calibration, $\mathcal{T}$ suggests a path towards accelerating calibration. In particular, each $T \in \mathcal{T}$ represents a disjoint subset $T \subseteq G$ that may be calibrated in parallel. Therefore, even though it is not strictly necessary to compute $\mathcal{T}$ to calibrate a graph, there are performance benefits to doing so.

Two example algorithms for finding a complete node traversal set and a complete edge traversal set are given below:

Example Algorithm for finding a Complete Node Traversal Set

```
find_complete_node_traversal_set (G, node_traversal_rule):
    # initialize complete node-traversal set
    𝒯 = { }
    # while all nodes N of a graph have not been traversed
    while N ⊈ ∪_{T ∈ 𝒯} T:
        # Initialize a traversal set
        T = { }
        # pick random un-traversed node
        n = random({n G : n ∉ ∪_{T ∈ 𝒯} T})
```

-continued

```
        # build that nodes traversal set
        node_traversal_algorithm (G, T, n, node_traversal_rule)
        # add traversal set to the complete node-traversal set
        𝒯 ∪ {T}
    return 𝒯
```

Example Algorithm for finding a Complete Edge Traversal Set

```
find_complete_edge_traversal_set (G, edge_traversal_rule):
    # initialize complete edge-traversal set
    𝒯 = { }
    # while all edges E of a graph have not been discovered
    while E ⊈ ∪_{T ∈ 𝒯} T:
        # Initialize a traversal set
        T = { }
        # pick random un-traversed edge
        e = random({e ∈ G : e ∉ ∪_{T ∈ 𝒯} T})
        # build that edges traversal set
        edge_traversal_algorithm_(G, T, e, edge_traversal_rule)
        # add traversal set to the complete node-traversal set
        𝒯 ∪ {T}
    return 𝒯
```

Figure 5:
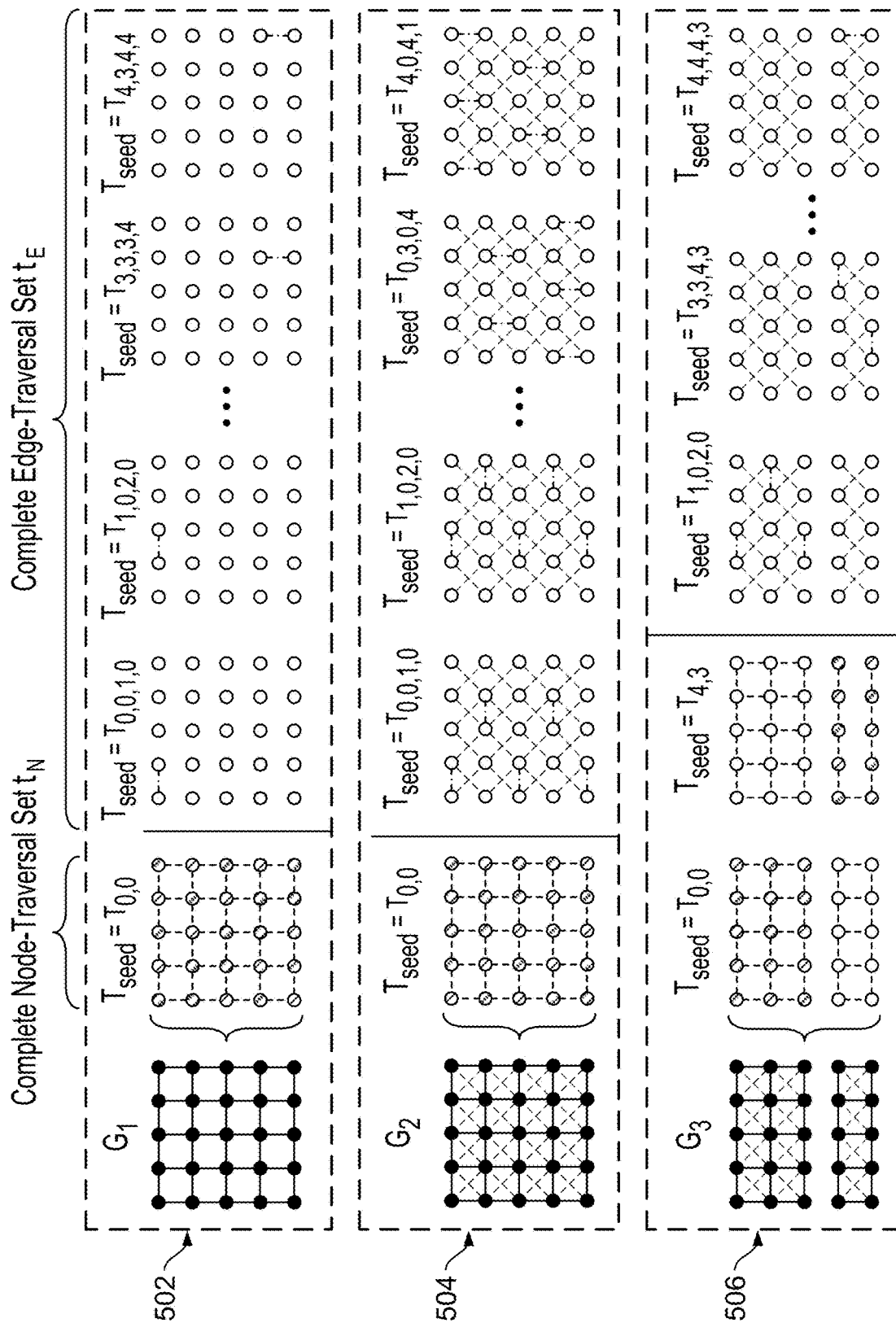
FIG. 5 is an illustration of an example algorithm for finding a complete node traversal set and an example algorithm for finding a complete edge traversal set for different graphs representing example quantum processors.

FIG. 5 is an illustration of complete node traversal sets and complete edge traversal sets generated by executing an example algorithm for finding a complete node traversal set and an example algorithm for finding a complete edge traversal set for different graphs representing respective quantum processors.

Box 502 illustrates an example algorithm for finding a complete node traversal set for the example graph 302 described above with reference to FIG. 3. In the central panel of box 502, a complete node-traversal set $\mathcal{T}_N$ is shown. The complete node traversal set includes one traversal set $T_{0,0}$ which includes all nodes of the graph $G_1$ and has been generated by running the traversal algorithm on "seed." This complete node traversal set corresponds directly to the nodes that were traversed in the center panel of box 402 in FIG. 4. The right panel of box 502 shows a complete edge traversal set $\mathcal{T}_E$. The complete edge traversal set includes multiple traversal sets $T_{seed}$ where "seed" indicates the edge that was used to seed the traversal algorithm and generate the respective traversal set. For example, in the furthest right graph. The edge $e_{4,3,4,4}$ was used to seed the traversal algorithm and generate the respective traversal set (consisting of only one edge $e_{4,3,4,4}$). These traversal sets correspond directly to the edges traversed in the right panel of box 402 of FIG. 4.

Box 504 illustrates an example algorithm for finding a complete node traversal set for the example graph 304 described above with reference to FIG. 3. In the central panel of box 504, a complete node-traversal set $\mathcal{T}_N$ is shown. The complete node traversal set includes one traversal set $T_{0,0}$ which includes all nodes of the graph $G_2$ and has been generated by running the traversal algorithm on "seed." This complete node traversal set corresponds directly to the nodes that were traversed in the center panel of box 404 in FIG. 4. The right panel of box 504 shows a complete edge traversal set $\mathcal{T}_E$. The complete edge traversal set includes multiple traversal sets $T_{seed}$ where "seed" indicates the edge that was used to seed the traversal algorithm and generate the respective traversal set. For example, in the furthest right graph. The edge $e_{4,0,4,1}$ was used to seed the traversal algorithm and generate the respective traversal set (consisting of five edges $e_{0,0,0,1}$, $e_{2,0,2,1}$, $e_{4,0,4,1}$, $e_{1,2,1,3}$, $e_{3,2,3,3}$). These traversal sets correspond directly to the edges traversed in the right panel of box 404 of FIG. 4.

Box 506 illustrates an algorithm for finding a complete node traversal set for the example graph 306 described above with reference to FIG. 3. In the central panel of box 506, a complete node-traversal set $\mathcal{T}_N$ is shown. The complete node traversal set includes two traversal sets—$T_{00}$ and $T_{4,3}$—which have been generated by running the traversal algorithm twice on two separate seed nodes $n_{0,0}$ and $n_{4,3}$. This complete node traversal set corresponds directly to the nodes that were traversed in the center panel of box 406 in FIG. 4. The right panel of box 506 shows a complete edge traversal set $\mathcal{T}_E$. The complete edge traversal set includes multiple traversal sets $T_{seed}$ where "seed" indicates the edge that was used to seed the traversal algorithm and generate the respective traversal set. For example, in the furthest right graph, the edge $e_{4,4,3,4}$ was used to seed the traversal algorithm and generate the respective traversal set (consisting of one edge $e_{4,3,4,4}$). These traversal sets correspond directly to the edges traversed in the right panel of box 406 of FIG. 4.

It is noted that even though the traversal algorithms and rules are the same for each of the graphs $G_1$, $G_2$, $G_3$, their respective complete traversal sets are different because of different device connectivities (represented by the graphs $G_1$, $G_2$, $G_3$). The number of unique seeds necessary to generate the traversal sets that a complete traversal set comprises depends on the selected traversal rule, traversal algorithm and device connectivity (generated graphs).

Returning to FIG. 2, the system determines calibrated values of the nodes or edges in each of the identified subsets (step 208). That is, in cases where the system identifies one or multiple disjoint subsets of nodes at step 206, the system determines calibrated values of the nodes in each of the identified subsets at step 208. Similarly, in cases where the system identifies one or multiple disjoint subsets of edges at step 206, the system determines calibrated values of the edges in each of the identified subsets at step 208. Calibrating both nodes and edges is described below.

Determining calibrated values of nodes or edges includes performing a process of optimizing an objective function to find optimal frequencies for an arbitrary collection of nodes and/or edges. To calibrate a graph (or a subset of nodes and/or edges in a graph), the graph is traversed with an arbitrary traversal algorithm, and an objective function is optimized at each step. The calibrated frequencies are stored in a mapping calibrated-frequency mapping F. F may be a key-value mapping which maps calibrated nodes and/or edges to their calibrated values. This mapping represents the authoritative calibration status of the graph. In cases where only a subset of nodes and/or edges are calibrated, edges or nodes that do not need calibrating may be indicated in the calibrated-frequency mapping, e.g., by a label "none."

The calibration objective represents a function $L(\mathcal{F}, F)$ that maps a set of node and/or edge frequencies that are under calibration $\mathcal{F}$ and the mapping of previously calibrated node and/or edge frequencies F, onto some performance metric. As an example, the performance metric may be related to frequency-dependent energy-relaxation, dephasing, leakage, and/or control errors. For example, $\mathcal{F}$ may be $\{f_{i,j}\}$ when calibrating a single node, $\{f_{i,j,k,l}\}$ when calibrating a single edge, or $\{f_{i,j}, f_{i,j,i+1,j}, f_{i,j,i-1,j}, f_{i,j,i,j+1}, f_{i,j,i,j-1}\}$ when calibrating a node and connecting horizontal and vertical edges simultaneously. Previously calibrated nodes and/or edges may constrain the objective function, while uncalibrated nodes and/or edges play no role. In many cases, the objective function may be decomposed into the form $L(\mathcal{F}, F) = C(\mathcal{F}) + \Lambda(\mathcal{F}, F)$, where $C(\mathcal{F})$ encompasses performance metrics of the to-be-calibrated nodes and/or edges only while $\Lambda(\mathcal{F}, F)$ encompasses constraints on the to-be-calibrated nodes and/or edges due to nearby and previously calibrated nodes and/or edges. As an example, $\Lambda$ may implement hard or soft bounds that prevent the idling and/or interacting frequencies under calibration from colliding with nearby and previously-calibrated idling and/or interacting frequencies.

The calibration objective represents a function $L(\mathcal{F}, F)$ can be constructed from a set of calibration datasets that may be kept in a Calibration Data Mapping D. D can be a key-value mapping which maps calibrated nodes and/or edges to one or more calibration datasets. Example datasets are frequency-dependent energy-relaxation, dephasing, leakage, and/or control-error datasets. Each calibration dataset can be constructed from some combination of measurements, theory, numerics, or simulations, etc. Depending on the parameter being calibrated and on how these parameters are interrelated, calibration data may be built before starting the calibration process 200, and/or at each step in the traversal (e.g., directly before or during step 208).

L may be minimized with respect to frequencies $\mathcal{F}$ to calibrate the corresponding nodes and/or edges. The formal solution to the calibration problem is $\mathcal{F}_{optimal} = \mathrm{argmin}[L(\mathcal{F}, F)]$. In cases where the set cardinality $|\mathcal{F}| > 1$, it can be impractical or even intractable to find the global minimum to this problem. However, a local solution may be sufficient. It is noted that an objective may be overconstrained by previously calibrated nodes and/or edges, in which case $\mathcal{F}_{optimal} = $ None.

FIGS. 6A, 6B and 7A, 7B are illustrations of example objective functions for nodes and/or edges in the graphs 302, 304, 306 described above with reference to FIG. 3. In each of the example objective functions, nodes are constrained by vertically, horizontally, or diagonally connected nodes only (they are not constrained by edges.) Furthermore, edges are constrained by the nodes that they connect, by horizontally and vertically connected nodes (not diagonally connected nodes), and by diagonally-connected edges that are parallel. Constraining the edges by diagonally connected edges that are parallel means that horizontal edges may only constrain horizontal edges, and vertical edges may only constrain vertical edges (as shown in FIGS. 6A, 6B and 7A, 7B). It is noted that FIGS. 6A, 6B and 7A, 7B illustrate non-limiting example objective functions only, and that generally the specific objective functions and constraints will depend on the parameter being calibrated, the quantum processor architecture and also on the quantum-algorithm for which the processor is being calibrated.

Figure 6A:
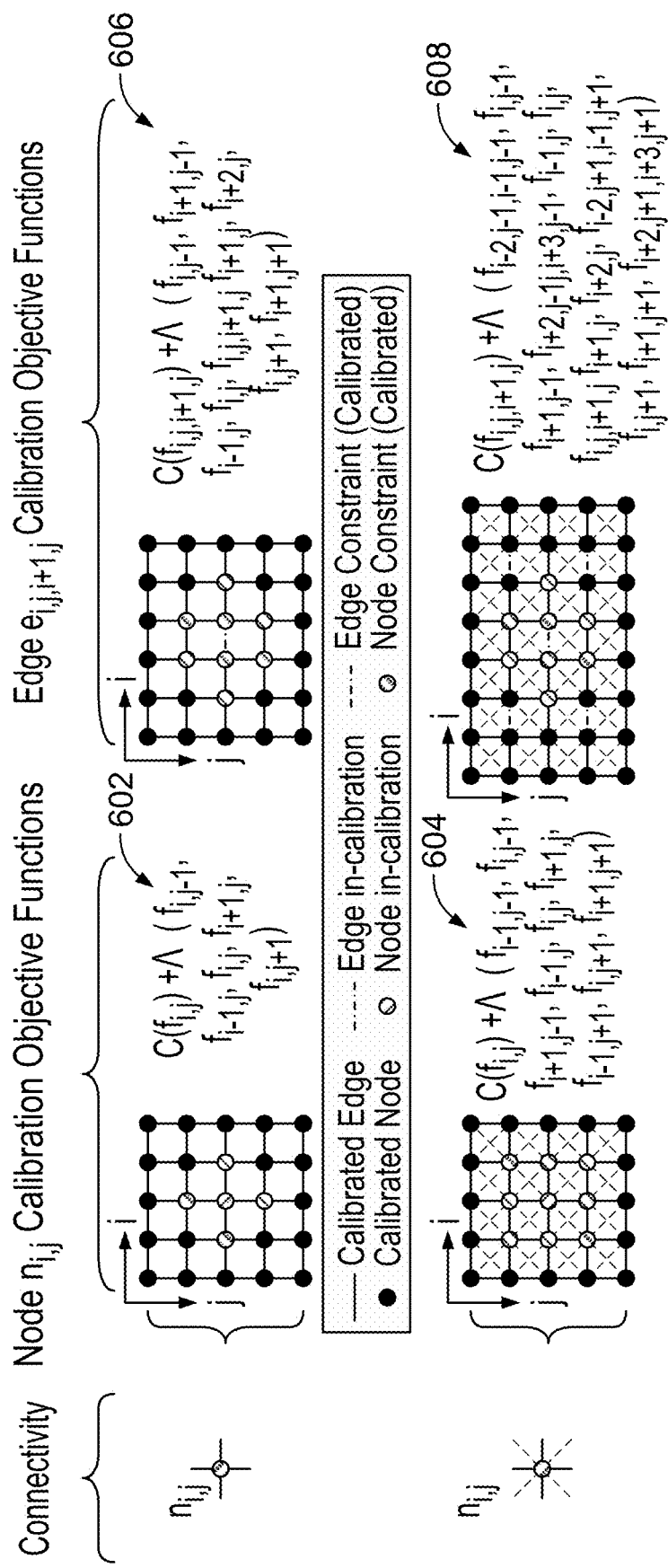
FIGS. 6A, 6B and 7A, 7B illustrate example objective functions.

FIG. 6A shows example node calibration objective functions 602, 604 and edge calibration objective functions 606, 608 for a general example node $n_{i,j}$ and general example edge $e_{i,j,i+1,j}$ with respective device connectivites shown in the panel on the left hand side. Example node calibration function 602 shows how when the example node $n_{i,j}$ is under calibration, already calibrated neighboring nodes (in this case nodes $n_{i,j-1}, n_{i,j+1}, n_{i-1,j}, n_{i+1,j}$) constrain the calibration of node $n_{i,j}$. Example node calibration function 604 shows how when the example node $n_{i,j}$ is under calibration, already calibrated neighboring nodes (in this case nodes $n_{i,j-1}, n_{i,j+1}, n_{i-1,j}, n_{i+1,j}$ and nodes $n_{i-1,j-1}, n_{i+1,j-1}, n_{i-1,j+1}, n_{i+1,j+1}$ since graph $G_2$ includes diagonal edges unlike graph $G_1$) constrain the calibration of node $n_{i,j}$.

Example edge calibration function 606 shows how when the example edge $e_{i,j,i+1,j}$ is under calibration, already calibrated neighboring nodes and already calibrated nodes that the edge connects (in this case nodes $n_{i-1,j}, n_{i,j-1}, n_{i,j+1}, n_{i+1,j-1}, n_{i+1,j+1}, n_{i+2,j}, n_{i,j}, n_{i+1,j}$ constrain the calibration of edge $e_{i,j,i+1,j}$. Example edge calibration function 608 shows how when the example edge $e_{i,j,i+1,j}$ is under calibration, already calibrated neighboring nodes and already calibrated nodes that the edge connects (in this case nodes $n_{i-1,j}$, $n_{i,j-1}$, $n_{i,j+1}$, $n_{i+1,j-1}$, $n_{i+1,j+1}$, $n_{i+2,j}$, $n_{i,j}$, $n_{i+1,j}$) and already calibrated edges $e_{i-2,j-1,i-1,j-1}$, $e_{i+2,j-1,i+3,j-1}$, $e_{i-2,j+1,i-1,j+1}$ and $e_{i+2,j+1,i+3,j+1}$ constrain the calibration of edge $e_{i,j,i+1,j}$.

Figure 6B:
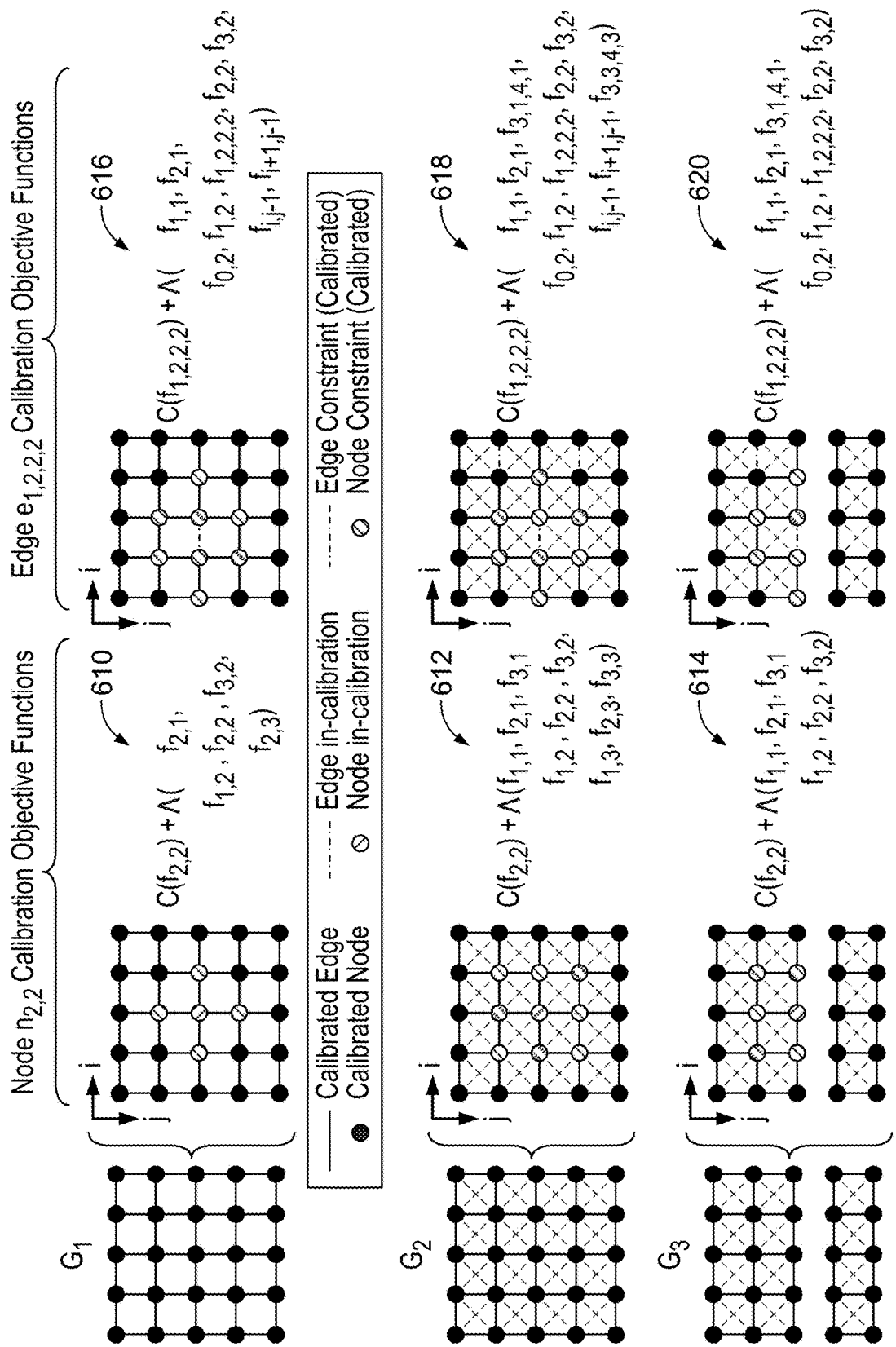

FIG. 6B shows example node calibration objective functions 610-614 and edge calibration objective functions 616-620 for example node $n_{2,2}$ in graphs $G_1$-$G_3$ of FIGS. 3-5. Node calibration objective functions 610 and 612, and edge calibration function 616 and 618 are similar to those described above with reference to FIG. 6A. Node calibration function 614 shows how when the node $n_{2,2}$ in graph $G_3$ is under calibration, already calibrated neighboring nodes (in this case nodes $n_{1,1}$, $n_{2,1}$, $n_{3,1}$, $n_{1,2}$, $n_{3,2}$) constrain the calibration of node $n_{2,2}$ (fewer nodes than those that constrain the calibration of node $n_{2,2}$ in $G_2$, since node $n_{2,2}$ in graph $G_3$ is a border node.)

Example edge calibration function 620 shows how when edge $e_{1,2,2,2}$ is under calibration, already calibrated neighboring nodes and already calibrated nodes that the edge connects $n_{1,1}$, $n_{2,1}$, $n_{0,2}$, $n_{1,2}$, $n_{2,2}$, $n_{3,2}$ and already calibrated edge $e_{3,1,4,1}$ constrain the calibration of edge $e_{1,2,2,2}$ (again, fewer nodes and edges than those that constrain the calibration of node $n_{2,2}$ in $G_2$, since node $n_{2,2}$ in graph $G_3$ is a border node.)

Figure 7A:
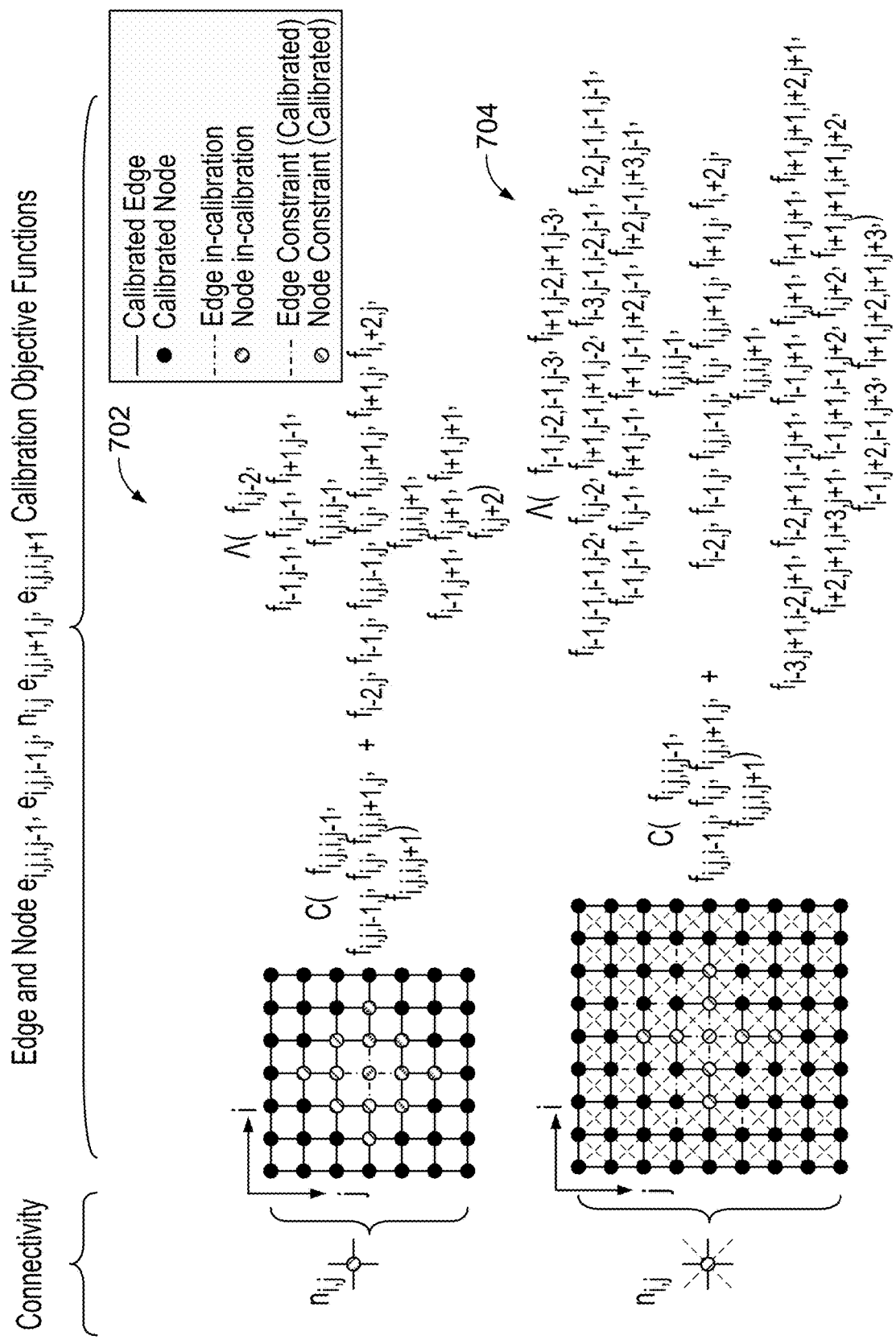

FIG. 7A shows example edge and node calibration objective functions 702 and 704 for the general node $n_{i,j}$ described with reference to FIG. 6A. Example edge and node calibration function 702 shows how when the example node $n_{i,j}$ and edges $e_{i,j,i,j-1}$, $e_{i,j,i-1,j}$, $e_{i,j,i+1,j}$, $e_{i,j,i,j+1}$ are under calibration, already calibrated nodes and edges in a neighborhood around the nodes and edges under calibration constrain the calibration of the node and edges. Specifically, in this example all calibrated nodes that neighbor the node under calibration and that neighbor nodes connected to the edges under calibration and that are connected by the edges under calibration constrain the calibration. That is, nodes $n_{i,j-2}$, $n_{i-1,j-1}$, $n_{i+1,j-1}$, $n_{i-2,j}$, $n_{i-1,j}$, $n_{i+2,j}$, $n_{i-1,j+1}$, $n_{i+1,j+1}$, $n_{i+1,j}$, $n_{i,j+2}$, $n_{i,j-1}$, $n_{i,j+1}$ constrain the calibration.

Example edge and node calibration function 704 shows how when the example node $n_{i,j}$ and edges $e_{i,j,i,j-1}$, $e_{i,j,i-1,j}$, $e_{i,j,i+1,j}$, $e_{i,j,i,j+1}$ are under calibration, already calibrated nodes and edges in a neighborhood around the nodes and edges under calibration constrain the calibration of the node and edges. Specifically, in this example all calibrated nodes that neighbor the node under calibration and that neighbor nodes connected to the edges under calibration and that are connected by the edges under calibration constrain the calibration. Since the connectivities for node $n_{i,j}$ in this case include diagonal edges, more nodes and edges constrain the calibration compared to those that constrain the calibration using example edge and node calibration objective function 702, as shown by the various terms in the edge and node calibration function 704.

Figure 7B:
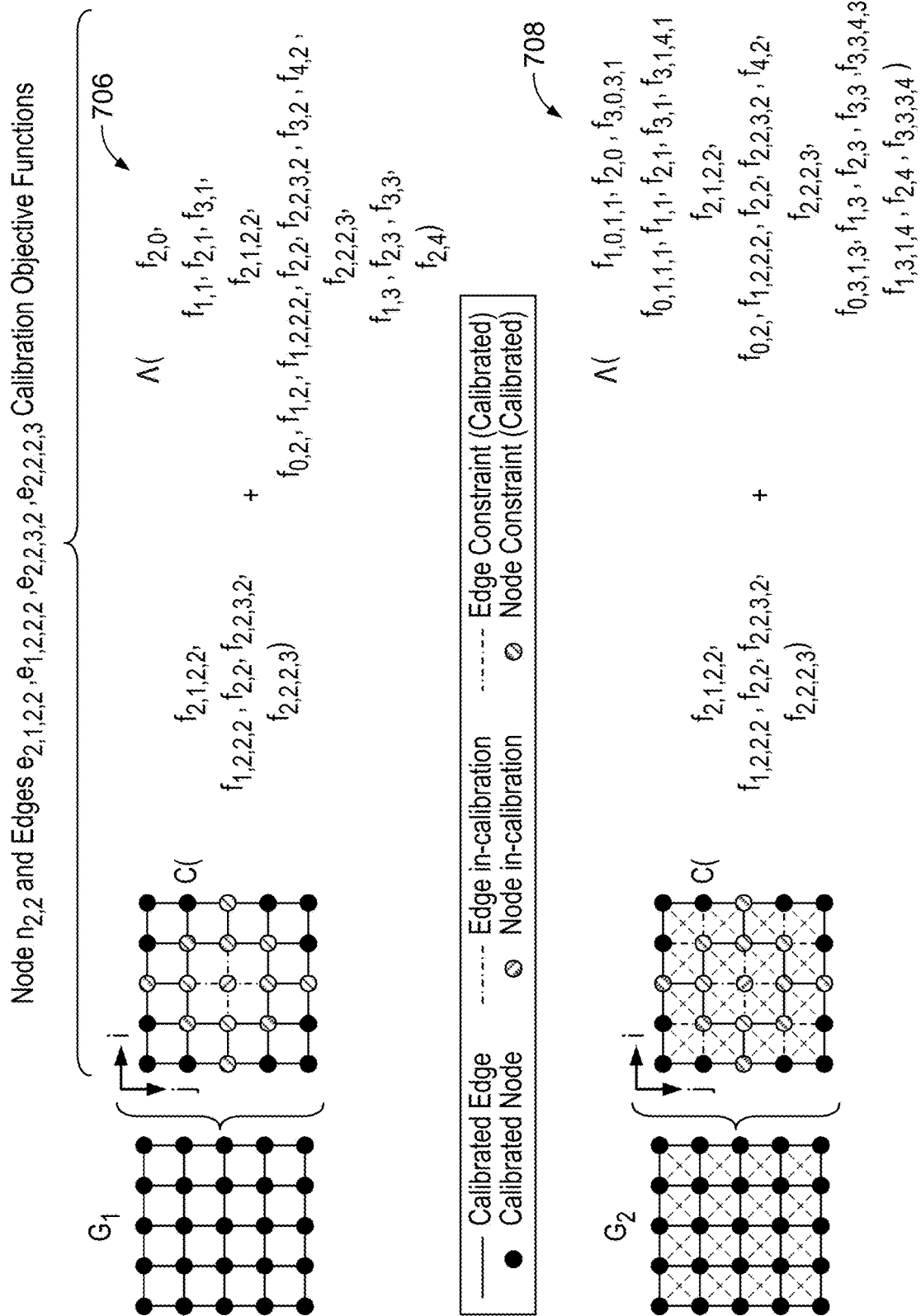

FIG. 7B shows example edge and node calibration objective functions 706 and 708 for example node $n_{2,2}$ in graphs $G_1$-$G_3$ of FIGS. 3-5. The edge and node calibration objective functions 706 and 708 are similar to those described above with reference to FIG. 7A.

Again, the example calibration objective functions shown in FIGS. 6A, 6B and 7A, 7B are examples only. In some implementations, a larger neighborhood of nodes and edges may be under calibration. Additionally, a larger or smaller neighborhood of already calibrated edges or nodes may be used to constrain a calibration. Generally, the specific objective function and constraints used can depend on the processor being calibrated, the quantum processor architecture and also on the quantum-algorithm for which the processor is being calibrated.

A calibration algorithm is an algorithm that traverses a graph via some traversal rule, while calibrating nodes and/or edges along the way. The algorithm depends on the graph G, the current node or edge, previously calibrated nodes and/or edges, the traversal rule, and the structure of the objective function.

Figure 8:
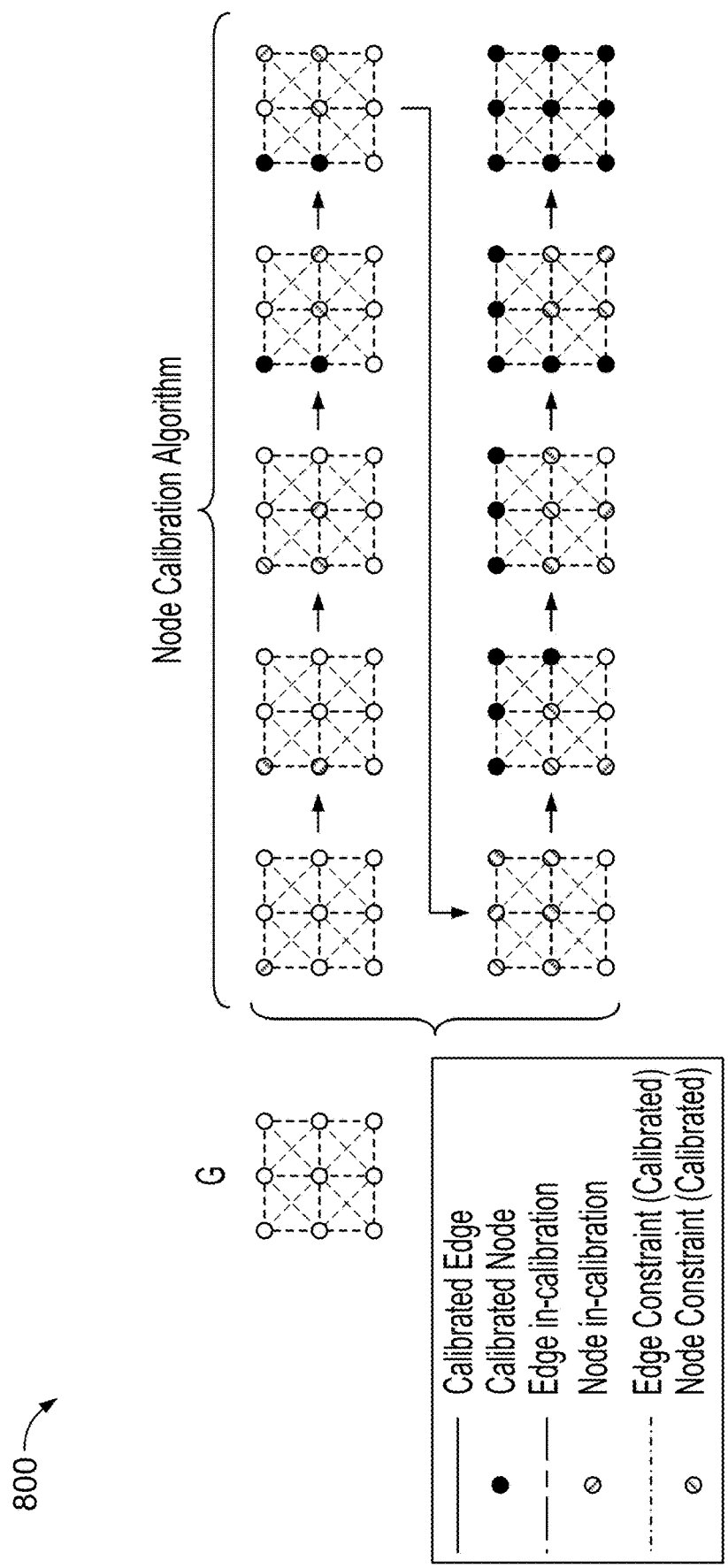
FIG. 8 illustrates an example recursive node calibration algorithm.

An example recursive node calibration algorithm is illustrated in FIG. 8 and given below:

Example Recursive Node-Calibration Algorithm |

```
node_calibration_algorithm(G, F, n, node_traversal_rule) :
    # If n has not yet been calibrated
    if n ∉ F:
        # Calibrate the node
        F[n] = argmin_{fn} [L_n (f_n , F) ]
        # Recurse over un-calibrated nodes under rule
        for {n' ∈ node_traversal_rule(G, n) : n' ∉ F} :
            node_calibration_algorithm(G, F, n' ,
                node_traversal_rule)
```

Figure 9:
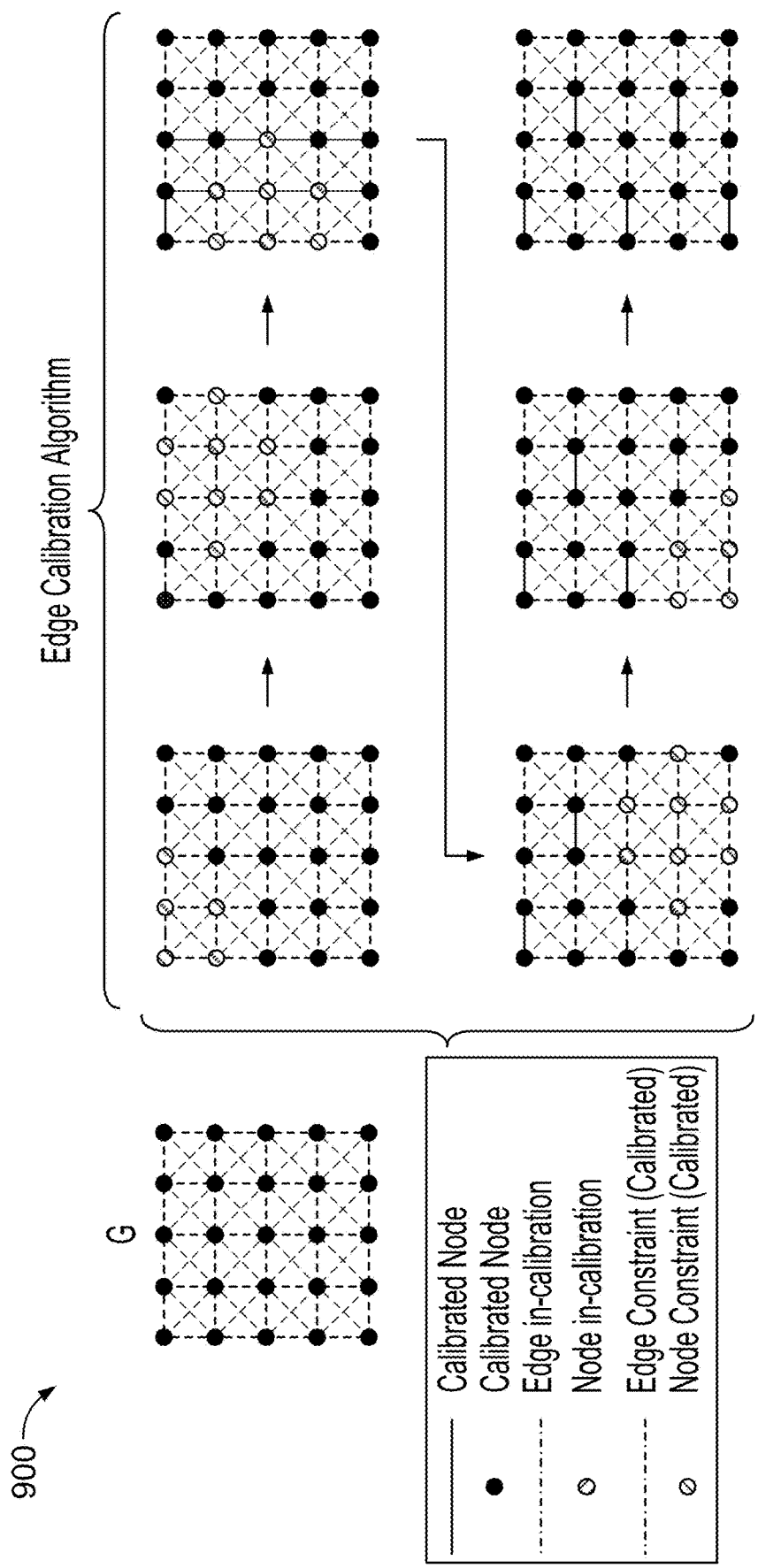
FIG. 9 illustrates an example recursive edge calibration algorithm.

An example recursive edge calibration algorithm is illustrated in FIG. 9 and given below:

Example Recursive Edge-Calibration Algorithm|

```
edge_calibration_algorithm(G, F, e, edge_traversal_rule):
    # If e has not yet been calibrated
    if e ∉ F:
        # Calibrate the edge
        F[e] = argmin_{fe} [L_e (f_e , F) ]
        # Recurse over un-calibrated edges under rule
        for {e' edge_traversal_rule(G, e) : n' ∉ F} :
            edge_calibration_algorithm(G, F, e',
                edge_traversal_rule)
```

Figure 10:
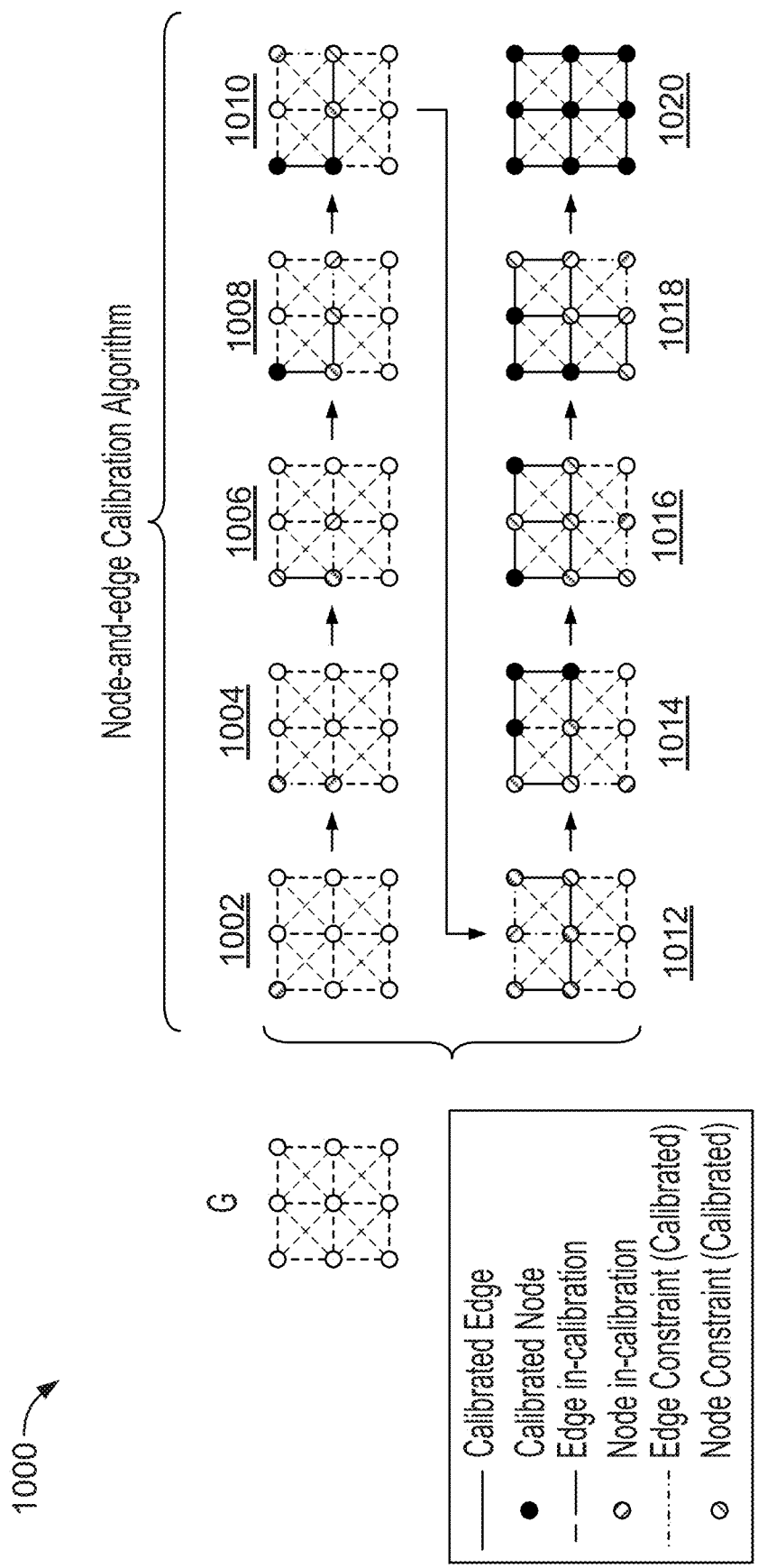
FIG. 10 illustrates an example edge and node calibration algorithm.

An example recursive edge and node calibration algorithm is illustrated in FIG. 10 and given below:

Exam Edge and Node Calibration Algorithm (see FIG. 9):

```
node_and_edge_calibration_algorithm(G, F, n, node_traversal_rule) :
    # If n has not yet been calibrated
    if n ∉ F:
        # Add to-be-calibrated nodes and edges into set
        g = {n} ∪ {e : n is connected by e}
        # Add corresponding frequencies into set
        F = {fn} ∪ {fe : n is connected by e}
        # Calibrate the node and edges
        F[g] = argmin_F[L(F, F) ]
        # Recurse over un-calibrated nodes under rule
        for {n' ∈ node_traversal_rule(G, n) : n' ∉ F}
            node_and_edge_calibration_algorithm (G, F, n' ,
                node_traversal_rule)
```

The node calibration algorithm and edge calibration algorithm given above and illustrated in FIGS. 8 and 9 perform 1D optimizations. That is, at each step of the graph traversal one node or one edge is optimized. However, the example edge and node calibration algorithm given above and illustrated in FIG. 10 can perform anywhere from a 1D optimization (corresponding to a step where a single node or edge is optimized) to a 5D optimization (corresponding to a step where a single node and four edges connected to that node are optimized).

For example, at step 1002 of FIG. 10, a single node $n_{0,0}$ (a selected seed node) of graph G is in calibration (being optimized). At step 1004, node $n_{0,0}$ has been calibrated and edge $e_{0,0,0,1}$ and node $n_{0,1}$ are in calibration. Calibrated node $n_{0,0}$ constrains the calibration. At step 1006 nodes $n_{0,0}$, $n_{0,1}$ and edge $e_{0,0,0,1}$ have been calibrated, and node $n_{1,1}$ and edge $e_{0,1,1,1}$ are in calibration. Calibrated nodes $n_{0,0}$ and $n_{0,1}$ constrain the calibration. At step 1008 node $n_{2,1}$ and edge $e_{1,1,2,1}$ are in calibration. Nodes $n_{0,1}$ and $n_{1,1}$ constrain the calibration. At step 1010 node $n_{2,0}$ and edge $e_{2,0,2,1}$ are in calibration. Nodes $n_{1,1}$ and $n_{2,1}$ constrain the calibration. At step 1012 node $n_{1,0}$ and edges $e_{0,0,1,0}$, $e_{1,0,2,0}$ and $e_{1,0,1,1}$ are in calibration. Nodes $n_{0,0}$, $n_{0,1}$, $n_{1,1}$, $n_{2,0}$ and $n_{2,1}$ constrain the calibration. At step 1014 node $n_{0,2}$ and edge $e_{0,1,0,2}$ are in calibration. Nodes $n_{0,0}$, $n_{0,1}$ and $n_{1,1}$ constrain the calibration. At step 1016 node $n_{1,2}$ and edges $e_{0,2,1,2}$, $e_{1,1,1,2}$ are in calibration. Nodes $n_{1,0}$, $n_{0,1}$, $n_{1,1}$, $n_{0,2}$ and $n_{2,1}$ constrain the calibration. At step 1018 node $n_{2,2}$ and edges $e_{1,2,2,2}$, $e_{2,1,2,2}$ are in calibration. Nodes $n_{0,2}$, $n_{1,2}$, $n_{1,1}$, $n_{2,1}$, and $n_{2,0}$ constrain the calibration. At step 1020 all nodes and horizontal and vertical edges have been calibrated.

It is noted that the edge and node calibration algorithm illustrated in FIG. 10 is one of many example edge and node calibration algorithms. For example, other algorithms may also use edges to constrain a calibration of a node or edge at one or more steps of the algorithm. As another example, other algorithms may include fewer or more steps to achieve a final calibrated graph. As another example, other algorithms may not calibrate all nodes or all horizontal/vertical edges. As another example, other algorithms may simultaneously calibrate a larger collection of nodes and/or edges at each traversal step. The specifics of the algorithm depend on the traversal rule, traversal algorithm, device connectivity, and the structure of the objective function.

Returning to FIG. 1, in cases where the system identifies multiple disjoint subsets of nodes (or edges), step 208 may be performed in parallel for each subset because the subsets are disjoint and correspond to disjoint regions of the graph/processor. It is noted that, when step 208 is performed in parallel, the processing of each subset may share constraining nodes and/or edges).

Determining calibrated values of the nodes or edges in each of the identified subsets includes, for each subset, selecting a seed node (in the case that the system is calibrating the nodes in the subset) or a seed edge (in the case that the system is calibrating the edges in the subset) from the subset. Since the traversal rules described above and used by the system are undirected traversal rules (e.g., rules whereby, if a node A can map to a node B, then node B also maps to node A), the system can select the seed node or seed edge arbitrarily.

Once the seed node or edge has been selected, the system performs a stepwise, e.g., iterative or recursive, process to determine the calibrated values of the nodes or edges in the subset.

The stepwise process includes, starting with the selected seed node (or seed edge) and for each subsequent node (or edge), performing a constrained optimization to determine a calibrated value of the node (or edge) (step 208a). The constrained optimization is performed using i) an objective function for the node or edge, and in some cases (e.g., cases other than when the first node or edge is being calibrated and the rest of the processor is uncalibrated) ii) one or more constraints based on a calibrated operating frequency mapping comprising calibrated values of calibrated nodes or calibrated edges in the graph.

The objective function is a function that maps an operating frequency for the node (or edge), e.g., a node idle operating frequency (or an edge operating frequency), to a quantum processor performance metric, e.g., quantum gate errors or quantum algorithm error. The specific form of the objective function is dependent on the specific realization and structure of the quantum processor and the quantum algorithms for which the processor is being calibrated.

Performing the constrained optimization includes adjusting/optimizing the objective function constrained by previously calibrated values. This adjustment/optimization determines an adjusted/improved calibrated value for the node (or edge) corresponding to an adjusted/improved qubit operating frequency (or interaction frequency). The algorithm used to perform the constrained optimization can vary. Example optimization algorithms includes brute force search or differential evolution.

The system stores the calibrated value in the calibrated operating frequency mapping (step 208b). The system determines whether each node (or each edge) in the subset has been calibrated (step 208c). In response to determining that each node (or each edge) in the subset has not been calibrated, the system traverses the graph based on the traversal rule and traversal algorithm to select a subsequent node or edge for the step/iteration (step 208d).

In response to determining that each node (or each edge) in the subset has been calibrated, the system may determine whether all nodes (or edges) in the graph have been calibrated or not (step 208e). In response to determining that all nodes (or edges) have not been calibrated (step 208f), the system may perform the process 208 for another subset that contains uncalibrated nodes (or edges). In response to determining that all nodes or edges in the graph have been calibrated, the system may set respective operating frequencies of the quantum processor to the calibrated values of the graph included in the calibrated operating frequency mapping (step 208g). For example, in the case where the process 208 is used to stepwise determine calibrated values of the nodes in each subset, the system sets respective qubit operating frequencies of the quantum processor to the calibrated values of the nodes in the subset. In the case where the process 208 is used to stepwise determine calibrated values of the edges in each subset, the system sets respective operating frequencies of the interactions between qubits in the quantum processor to the calibrated values of the edges in the subset. The quantum processor may then be used to perform quantum computations.

Re-Calibration

In some implementations the system may further determine whether any calibrated values of nodes or edges in the graph are no longer valid, e.g., have timed out and drifted from a calibrated value to an uncalibrated value. For example, sometimes the objective function may drift in time, and because of this some calibrated values may be associated with a predetermined time-threshold after which the calibrations are invalidated. As another example, sometime a qubit may start to return unexpected or bad data during a quantum computation. In these cases it can be assumed that calibrations (e.g., for the qubit and/or within a vicinity around the qubit) are no longer valid. If the system determines that one or more calibrated values are no longer valid, the system may update the calibrated frequency mapping (to ensure that the mapping reflects the current status of calibrated/uncalibrated values) and the calibration data mapping, and may perform a recalibration process to recalibrate at least the calibrated values that are no longer valid.

Figure 11:
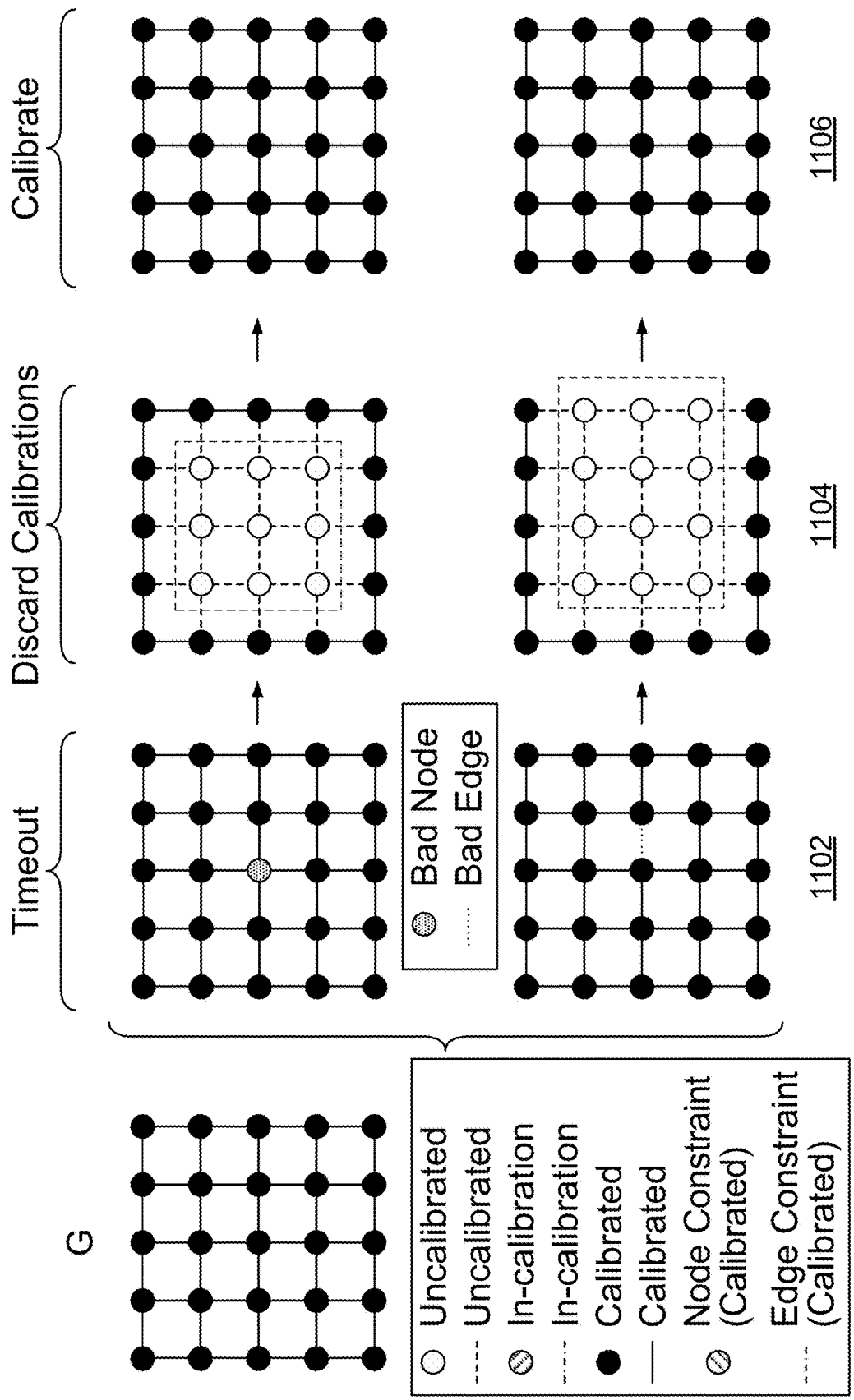
FIG. 11 illustrates an example recalibration process.

An example recalibration process is illustrated in FIG. 11. To perform the recalibration process, the system may discard (i.e., label as uncalibrated in the calibrated frequency mapping, or discard the corresponding key-value pair) the calibration values that are no longer valid together with calibration values in a local region of predetermined size around the timed out values (1102), e.g., node $n_{2,2}$ of graph G. For example, for a node whose value is no longer valid, the system may discard values corresponding to the node and its nearest neighbor nodes, e.g., nodes $n_{1,1}$, $n_{1,2}$, $n_{1,3}$, $n_{2,1}$, $n_{2,2}$, $n_{2,3}$, $n_{3,1}$, $n_{3,2}$, $n_{3,3}$. Edges that connect all discarded nodes to its nearest neighbors may also be discarded (1104). The system may maintain calibrated values outside of the local region. The system may then recalibrate the graph using the example process 200 described above, or the variants thereof described below (1106). In some implementations, when performing the example process 200 to recalibrate the graph, selecting a seed node (or edge) in an identified subset of nodes (or edges) may include selecting a seed node or a seed edge corresponding to a timed out node or edge. This may improve the calibration process, since nodes and edges with "good" calibrations (i.e., calibrations that have not timed out or otherwise drifted) generally impose constraints that are applied during the constrained optimization. However, by seeding with a "bad" node (or edge), the corresponding objective function will then have minimal constraints and thus maximal freedom to find a better solution.

Parallel Optimization of Disjoint Regions

A graph may have multiple uncalibrated subsets that are disjoint under a selected traversal algorithm. To identify whether a graph is disjoint under a selected traversal algorithm, the system computes the corresponding complete-traversal-set $\mathcal{T}$. If the cardinality of the complete-traversal set $|\mathcal{T}|>1$, the graph is disjoint, with disjoint subsets $T \in \mathcal{T}$. The disjoint regions may be calibrated independently and in parallel using the example process 200, and the solutions generated by process 200 may be combined. In some implementations independently recalibrated regions may share constraining nodes and/or edges.

Figure 12:
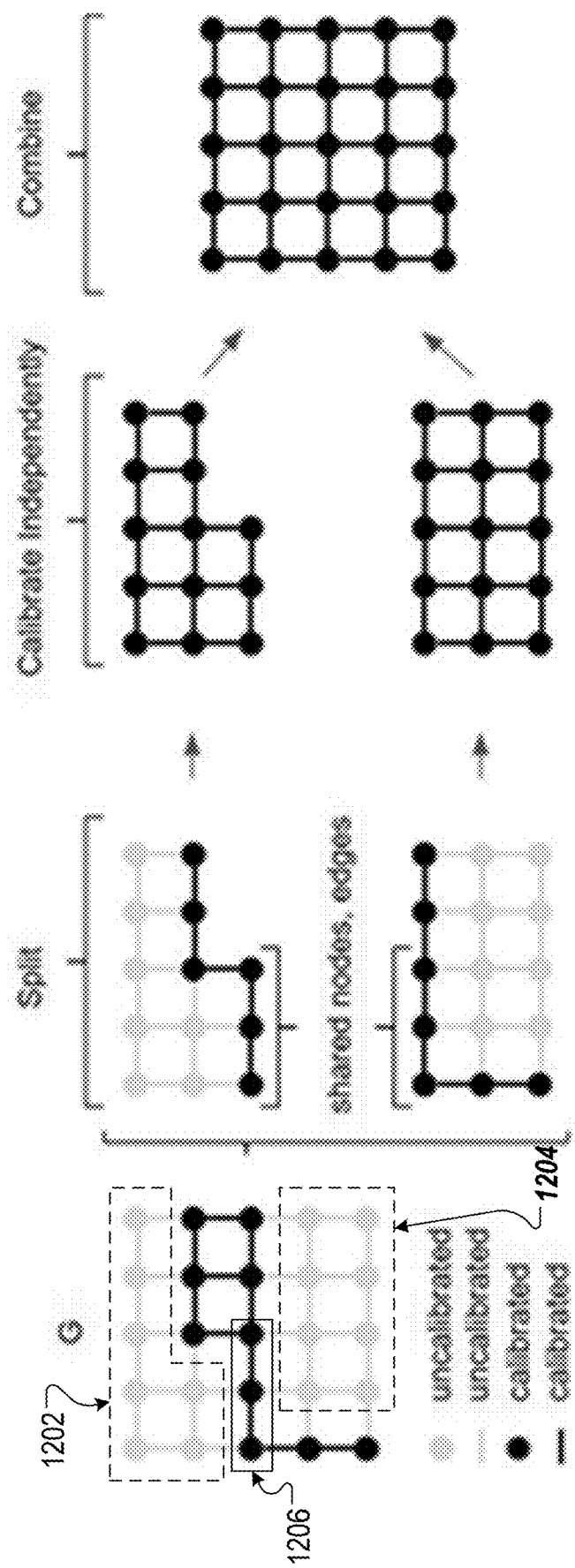
FIG. 12 illustrates an example process for parallel optimization of disjoint regions of a graph representing a quantum processor.

FIG. 12 illustrates an example process for parallel optimization of disjoint regions of a graph representing a quantum processor. As shown in FIG. 12, graph G incudes two uncalibrated subsets of nodes and edges 1202, 1204. In this example, the two subsets share nodes and edges 1206, some of which may be constraining. To optimize the two disjoint regions 1202 and 1204, the system splits the graph G into two subgraphs that include the disjoint regions, respectively, and any neighboring calibrated nodes or edges. Since in this example the subsets 1202 and 1204 share nodes and edges, the shared nodes and edges appear in both generated subgraphs. The two subgraphs are then calibrated using process 200 independently and in parallel. Calibrated values of the subsets 1202 and 1204 are then combined to generate a complete calibrated graph G.

Creating, Calibrating, Stitching Disjoint Regions

In some implementations calibrated regions of a graph, which are separated by un-calibrated regions, can be stitched/combined by application of the example process 200 or variations thereof. In combination with the fact that disjoint subsets of a graph may be calibrated in parallel, this enables more creative calibration procedures. The system can split the graph into several subgraphs, some of which may be calibrated in parallel, and the calibrations may be stitched together.

Figure 13:
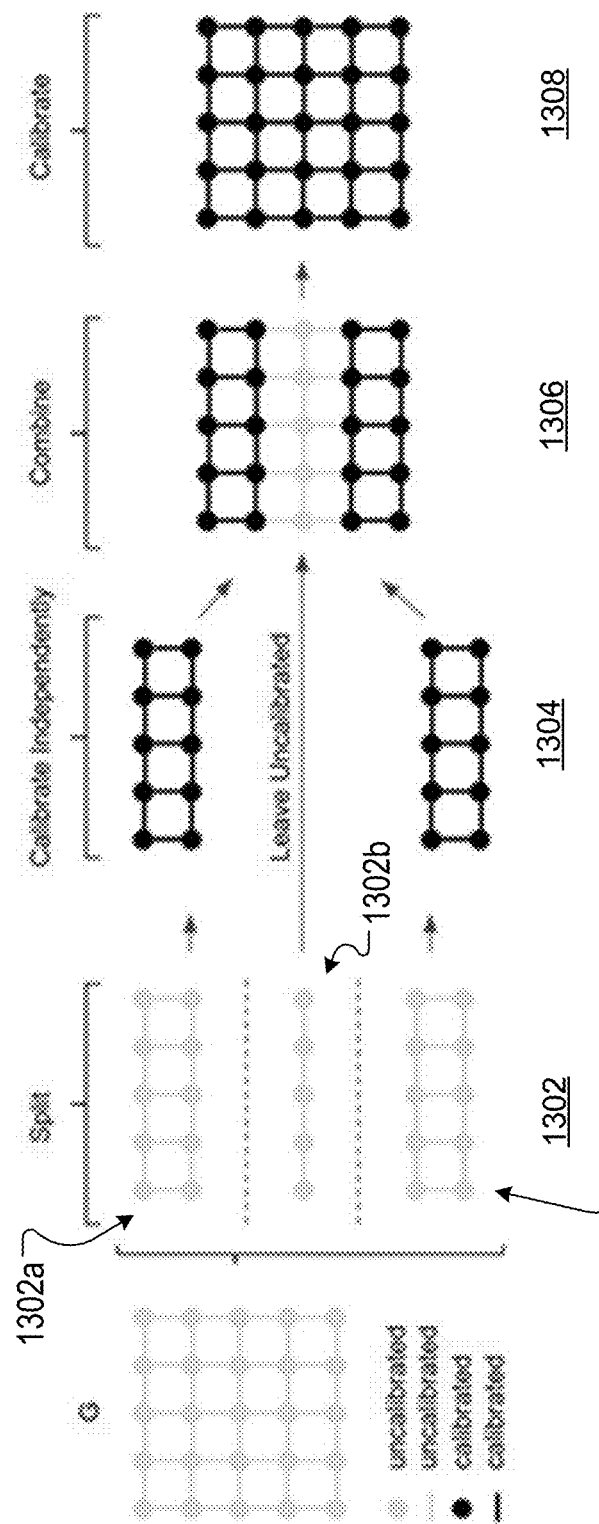
FIG. 13 illustrates an example process for creating, calibrating, and stitching disjoint regions of a graph representing a quantum processor.

FIG. 13 illustrates an example process for creating, calibrating, and stitching disjoint regions of a graph representing a quantum processor. At step 1302, the graph G is split into three disjoint subgraphs 1302a-c. At step 1304, subgraphs 1302a and 1302c (which are separated by subgraph 1302b) are calibrated independently and in parallel. At step 1306 the subgraphs are combined. At step 1308 subgraph 1302b is calibrated. Since subgraphs 1302a and 1302c are already calibrated, the calibration procedure used to calibrate subgraph 1302b depends on the calibrated values for subgraphs 1302a and 1302c. This can accelerate the calibration of the graph G, e.g., as opposed to calibrating the full graph G without parallelization.

Figure 14:
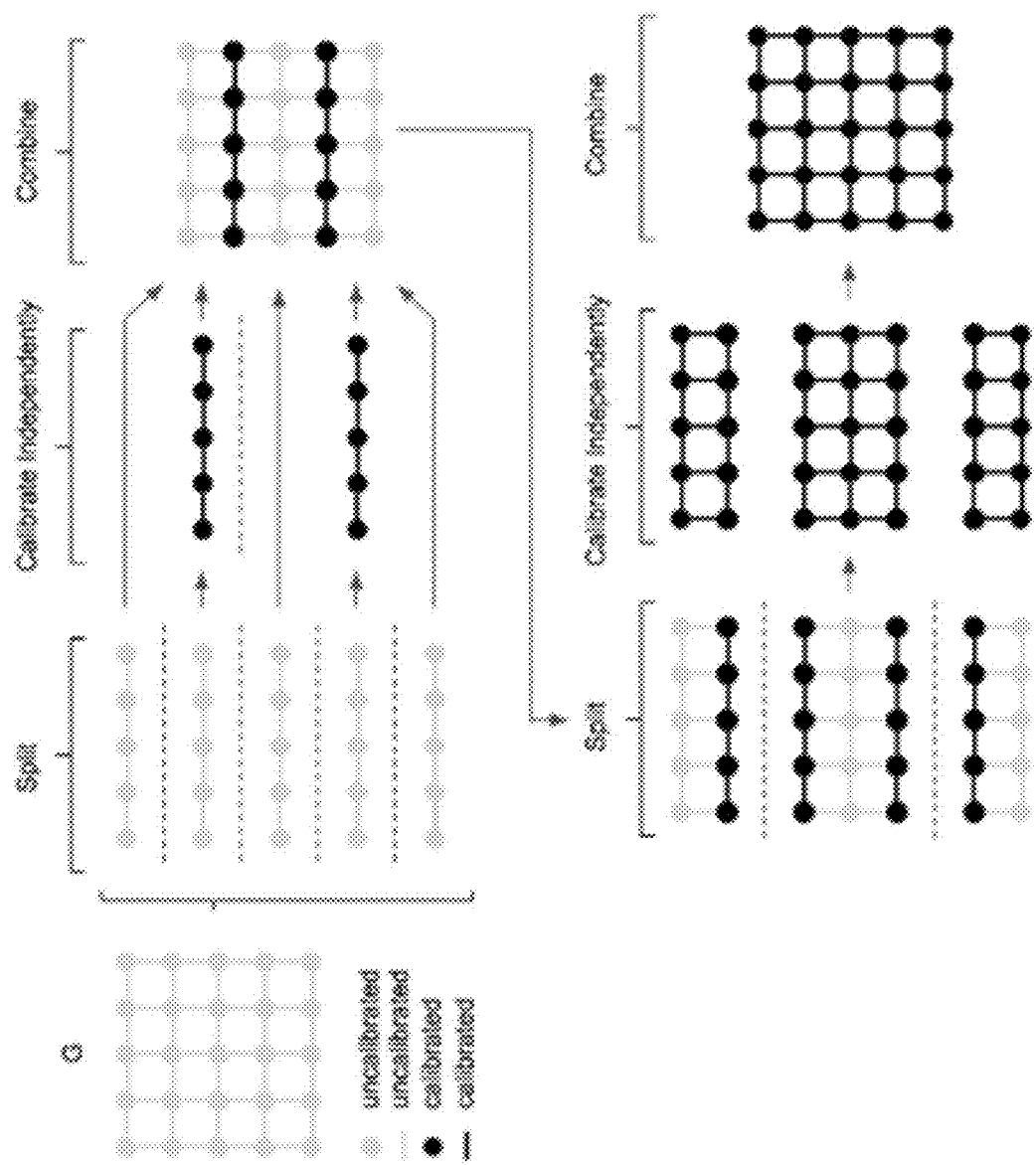
FIG. 14 illustrates an example process that combines creating, calibrating, stitching and optimizing disjoint regions of a graph representing a quantum processor.

In addition to accelerating the calibration procedure via parallelization, the capacity for stitching independently calibrated regions enables hybrid calibration approaches that employ different calibration algorithms, which can improve the quality of the calibration procedure. For example, the system may separate the graph of nodes and edges into multiple subgraphs, perform the example process 200 or variations thereof for some or all of the multiple subgraphs in parallel, recombine the subgraphs, determine whether the graph includes one or more un-calibrated subgraphs, and in response to determining that the graph comprises one or more un-calibrated subgraphs, calibrate the graph. FIG. 14 illustrates an example process that combines creating, calibrating, stitching and optimizing disjoint regions of a graph representing a quantum processor.

Example Method for Calibrating a Fully or Partially Calibrated Graph: Sequential Calibration of Qubit Operating Frequencies and Interaction Operating Frequencies The example process 200 described with reference to FIG. 2 is described as a process for determining calibrated values of graph nodes (representing qubits) or of graph edges (representing interactions between qubits) that correspond to either respective qubit idle operating frequencies or interaction operating frequencies. However, the example process 200 can also be applied sequentially to determine calibrated values of both nodes and edges.

For example, to determine calibrated values of both nodes and edges, the system performing the process 200 may first perform the process 200 to calibrate the nodes. This includes performing steps 202-208 focusing on the graph nodes: the system may select a graph traversal algorithm that traverses at least one of nodes or edges of the graph based on a node-traversal rule, the system may identify one or multiple disjoint subsets of nodes, determining calibrated values of nodes or edges may include determining calibrated values of nodes only, and selecting a seed node or seed edge before performing the constrained optimization may include selecting a seed node.

Then, the system may perform some steps of the process 200 to calibrate the edges. This includes performing steps 204-208 focusing on the graph edges.

As another example, the system may first perform the process 200 to calibrate the edges, then perform some of the steps of the process 200 to calibrate the nodes.

One example algorithm for sequential calibration of both nodes and edges is given below.

---

Algorithm 1
Sequential Calibration of Nodes and Edges

1. Start with graph G.
2. Establish an arbitrary calibrated-frequency mapping F.

-continued

Algorithm 1
Sequential Calibration of Nodes and Edges

3. Establish a node-traversal rule and algorithm, and build $\mathcal{T}_N$ accordingly.
   a. For each node-traversal set $T_n \in \mathcal{T}_N$ (parallelizable)
      i. Pick one r seed node $n_s \in T_n$.
      ii. Run the node-calibration algorithm with G, F, $n_s$, node-traversal
         rule.
4. Establish an edge-traversal rule and algorithm and build $\mathcal{T}$ accordingly.
   a. For each edge-traversal set $T_e$ n $\in \mathcal{T}_E$ (parallelizable)
      i. Pick one seed node $e_s \in T_e$.
      ii. Run the edge-calibration algorithm with G, F, $e_s$, edge-traversal
         rule

Example Method for Calibrating a Fully or Partially Calibrated Graph: Simultaneous Calibration of Qubit Operating Frequencies and Interaction Operating Frequencies The example process 200 described with reference to FIG. 2 is described as a process for determining calibrated values of graph nodes (representing qubits) or of graph edges (representing interactions between qubits) that correspond to either respective qubit operating frequencies or interaction operating frequencies. However, the example process 200 can also be applied simultaneously to determine calibrated values of both nodes and edges.

For example, to determine calibrated values of both nodes and edges, the system performing the process 200 may perform step 202 and generate a graph comprising nodes and edges, wherein each node represents a respective qubit and is associated with a value representing an operating frequency of the respective qubit, and wherein each edge represents a respective interaction between two qubits and is associated with a value representing an operating frequency of the respective interaction.

The system may then select a graph traversal algorithm that traverses nodes and edges of the graph based on a node-traversal rule (variant of step 204).

The system may then identify one or multiple disjoint subsets of nodes, wherein nodes in a subset of nodes are related via the node-traversal rule (variant of step 206).

The system may determine calibrated values for the nodes and edges in each subset (variant of step 208). This may include, for each subset, selecting a seed node in the subset, e.g., at random. The system then stepwise, for the selected seed node and for each subsequent node, performs a constrained optimization to determine a calibrated value for the node and one or more edges that connect the node to an already calibrated node (variant of step 208a). The constrained optimization uses i) an objective function for the node and one or more edges that connect the node to an already calibrated node, and ii) one or more constraints based on calibrated values in the calibrated operating frequency mapping of calibrated nodes and/or edges within a local region of predetermined size around the node. The size of the local region can be determined based on computational cost considerations. For example, the example procedure shown in FIG. 10 could include a larger local region where the region extends outwards such that the calibration process optimizes more nodes and edges simultaneously. This would increase the computational costs, but could potentially result in a better final calibration. Increasing the size of the local region to cover the whole graph would result in a global optimization being performed—where all nodes and edges are simultaneously optimized.

As described with reference to steps 208b-208g of FIG. 2, the system may then determine whether each node and edge in the subset has been calibrated. In response to determining that each node and edge in the subset has not been calibrated, the system traverses the graph based on the traversal rule to select a subsequent node for the step. In response to determining that each node and edge in the subset has been calibrated, the system determines whether each node and edge in the graph has been calibrated. In response to determining that each node and edge in the graph has not been calibrated, the system selects another subset of nodes that includes an uncalibrated node and/or edge and repeats the process. In response to determine that each node and edge in the graph have been calibrated, the system sets the operating frequencies of the quantum processor using the calibrated frequency mapping.

The presently described example method for simultaneous calibration of qubit operating frequencies and interaction operating frequencies can include additional features described above with reference to process 200 of FIG. 2, which for brevity are not repeated here.

One example algorithm for simultaneous calibration of both nodes and edges is given below.

Algorithm 2
Simultaneous Calibration of Nodes and Edges using Node Traversal

1. Start with graph G.
2. Establish an arbitrary calibrated-frequency mapping F.
3. Establish a node-traversal rule and algorithm, and build $\mathcal{T}_N$ accordingly.
   a. For each node-traversal set $T_n$ $\mathcal{T}_N$ (parallelizable).
      i. Pick one seed node $n_s \in T_n$.
      ii. Run the node-and-edge calibration algorithm with G, F, $n_s$, node-
         traversal rule Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum processors" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for determining quantum processor operating parameters, the method comprising:
for a quantum processor having a plurality of interacting qubits and represented by a graph comprising nodes and edges, wherein each node represents a respective qubit and is associated with a value representing an operating parameter of the respective qubit, and wherein each edge represents a respective interaction between two qubits and is associated with a value representing an operating parameter of the respective interaction:
selecting, by a classical computing device, a graph traversal algorithm that traverses the graph based on a traversal rule;
identifying, by a classical computing device, one or multiple disjoint subsets of nodes or one or multiple disjoint subsets of edges, wherein nodes in a subset of nodes are related via the traversal rule and edges in a subset of edges are related via the traversal rule;
determining, by a classical computing device, calibrated values for the nodes or edges in each subset, comprising, for each subset:
selecting a seed node or a seed edge in the subset;
stepwise, for the selected seed node or seed edge, and for each subsequent node or edge:
performing a constrained optimization using i) an objective function for the node or edge, and ii) one or more constraints based on a calibrated operating parameter mapping comprising calibrated values of nodes or edges in the graph, to determine a calibrated value for the node or edge;
determining whether each node or edge in the subset has been calibrated;
in response to determining that each node or edge in the subset has not been calibrated, traversing the graph based on the traversal rule to select a subsequent node or edge for the step.

2. The method of claim 1, further comprising storing the determined calibrated value in the calibrated operating parameter mapping.

3. The method of claim 1, wherein the traversal rule comprises an undirected traversal rule.

4. The method of claim 1, wherein the one or more constraints comprise constraints based on calibrated values of nodes or edges within a local region of predetermined size around the node or the edge.

5. The method of claim 1, further comprising, in response to determining that each node or edge in the subset has been calibrated:
determining whether each node or edge in the graph has been calibrated; and
in response to determining that each node or edge in the graph has been calibrated, setting the operating parameters of the quantum processor to the calibrated values included in the calibrated operating parameter mapping.

6. The method of claim 5, further comprising, in response to determining that all nodes or edges in the graph have not been calibrated:
determining calibrated values for the nodes or edges in another subset that contains uncalibrated nodes or edges.

7. The method of claim 1, further comprising:
determining whether any calibrated values of nodes or edges have timed out; and
in response to determining that a calibrated value of a node or edge has timed out:
updating the calibrated frequency mapping;
discarding calibration values in a local region of predetermined size around the timed out calibrated value;
maintaining calibrated values outside of the local region; and
recalibrating the graph.

8. The method of claim 6, wherein recalibrating the graph comprises selecting a seed node or a seed edge corresponding to a timed out node or edge.

9. The method of claim 1, wherein:
the traversal rule comprises a node-traversal rule;
identifying one or multiple disjoint subsets of nodes or one or multiple disjoint subsets of edges comprises identifying one or multiple disjoint subsets of nodes;
determining calibrated values of the nodes or edges in each subset comprises determining calibrated values of the nodes in each subset; and
selecting a seed node or a seed edge in the subset comprises selecting a seed node in the sub set.

10. The method of claim 9, further comprising:
selecting a graph traversal algorithm, wherein the graph traversal algorithm comprises an algorithm that traverses edges of the graph based on an edge traversal rule;
identifying one or more disjoint subsets of edges, wherein nodes and edges in each of the disjoint subsets are connected using the traversal rule;
determining calibrated values of the edges in each subset, comprising, for each subset:
selecting a seed edge in the subset;
stepwise, for the selected seed edge, and for each subsequent edge:
performing a constrained optimization using i) an objective function for the edge, and ii) one or more constraints based on a calibrated operating parameter mapping comprising calibrated values of edges in the graph, to determine a calibrated value for the edge;
determining whether each edge in the subset has been calibrated;
in response to determining that each edge in the subset has not been calibrated, traversing the graph based on the traversal rule to select a subsequent edge for the step.

11. The method of claim 1, wherein:
the traversal rule comprises an edge traversal rule:
identifying one or multiple disjoint subsets of nodes or one or multiple disjoint subsets of edges comprises identifying one or more disjoint subsets of edges;
determining calibrated values of the nodes or edges in each subset comprises calibrating the edges in each subset; and
selecting a seed node or a seed edge in the subset comprises selecting a seed edge in the sub set.

12. The method of claim 11, further comprising:
selecting a graph traversal algorithm, wherein the graph traversal algorithm comprises an algorithm that traverses nodes of the graph based on an node_traversal_rule;
determining a complete traversal set comprising one or more disjoint subsets of nodes, wherein nodes and edges in each of the disjoint subsets are connected using the traversal rule;
determining calibrated values of the nodes in each subset, comprising, for each subset:
selecting a seed node in the subset;
stepwise, for the selected seed node, and for each subsequent node:
performing a constrained optimization using i) an objective function for the node, and ii) one or more constraints based on a calibrated operating parameter mapping comprising calibrated values of nodes in the graph, to determine a calibrated value for the node;
determining whether each node in the subset has been calibrated;
in response to determining that each node in the subset has not been calibrated, traversing the graph based on the traversal rule to select a subsequent node for the step.

13. The method of claim 1, wherein:
the traversal rule comprises a node-traversal rule;
identifying one or multiple disjoint subsets of nodes or one or multiple disjoint subsets of edges comprises identifying one or more disjoint subsets of nodes; and
the method further comprises determining calibrated values of the nodes and edges in each subset, comprising, for each subset:
selecting a seed node in the subset;
stepwise, for the selected seed node, and for each subsequent node:
performing a constrained optimization using i) an objective function for one or more nodes and one or more edges, and ii) one or more constraints based on calibrated values in the calibrated operating frequency mapping of calibrated nodes or edges within a local region of predetermined size around the node, to determine a calibrated value for the node and one or more edges that connect the node to an already calibrated node;
determining whether each node or edge in the subset has been calibrated;
in response to determining that each node or edge in the subset has not been calibrated, traversing the graph based on the traversal rule to select a subsequent node for the step.

14. The method of claim 1, wherein determining calibrated values of the nodes or edges in each subset is performed in parallel for each subset.

15. The method of claim 1, further comprising:
separating the graph of nodes and edges into multiple subgraphs;
determining calibrated values for nodes or edges in subsets of some or all of the multiple subgraphs in parallel;
recombining the subgraphs into the graph;
determining whether the graph comprises one or more un-calibrated subgraphs; and
in response to determining that the graph comprises one or more un-calibrated subgraphs, calibrating the graph.

16. The method of claim 1, wherein selecting the graph traversal algorithm comprises selecting the graph traversal algorithm based on the interactions between qubits in the quantum processor.

17. The method of claim 1, wherein the operating parameter of the respective qubit comprises an idling frequency, readout frequency, or interaction frequency of the respective qubit.

18. An apparatus comprising one or more classical computers and one or more classical storage devices storing instructions that are operable, when executed by the one or more computers, to cause the one or more classical computers to perform operations comprising:
for a quantum processor having a plurality of interacting qubits represented by a graph comprising nodes and edges, wherein each node represents a respective qubit and is associated with a value representing an operating parameter of the respective qubit, and wherein each edge represents a respective interaction between two qubits and is associated with a value representing an operating parameter of the respective interaction:
selecting a graph traversal algorithm that traverses the graph based on a traversal rule;

identifying one or multiple disjoint subsets of nodes or one or multiple disjoint subsets of edges, wherein nodes in a subset of nodes are related via the traversal rule and edges in a subset of edges are related via the traversal rule;
  determining calibrated values for the nodes or edges in each subset, comprising, for each subset:
  selecting a seed node or a seed edge in the subset;
  stepwise, for the selected seed node or seed edge, and for each subsequent node or edge:
    performing a constrained optimization using i) an objective function for the node or edge, and ii) one or more constraints based on a calibrated operating parameter mapping comprising calibrated values of nodes or edges in the graph, to determine a calibrated value for the node or edge;
    determining whether each node or edge in the subset has been calibrated;
    in response to determining that each node or edge in the subset has not been calibrated, traversing the graph based on the traversal rule to select a subsequent node or edge for the step.

\* \* \* \* \*

UNITED STATES PATENT AND TRADEMARK OFFICE
CERTIFICATE OF CORRECTION

| | | |
|---|---|---|
| PATENT NO. | : 11,699,088 B2 | Page 1 of 1 |
| APPLICATION NO. | : 16/434513 | |
| DATED | : July 11, 2023 | |
| INVENTOR(S) | : Kilmov | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this
Twentieth Day of May, 2025

Coke Morgan Stewart
*Acting Director of the United States Patent and Trademark Office*